United States Patent
Khosla et al.

(10) Patent No.: US 7,895,071 B2
(45) Date of Patent: Feb. 22, 2011

(54) SYSTEM AND METHOD FOR MULTI-MISSION PRIORITIZATION USING COST-BASED MISSION SCHEDULING

(75) Inventors: Deepak Khosla, Camarillo, CA (US); Alex Dow, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1188 days.

(21) Appl. No.: 11/504,227

(22) Filed: Aug. 14, 2006

(65) Prior Publication Data
US 2008/0040190 A1 Feb. 14, 2008

(51) Int. Cl.
G06F 9/46 (2006.01)
(52) U.S. Cl. .......................................................... 705/9
(58) Field of Classification Search ....................... 705/9
See application file for complete search history.

(56) References Cited

U.S. PATENT DOCUMENTS

| | | | | |
|---|---|---|---|---|
| 5,340,056 | A * | 8/1994 | Guelman et al. | 244/3.16 |
| 5,406,476 | A * | 4/1995 | Deziel et al. | 705/8 |
| 5,890,134 | A * | 3/1999 | Fox | 705/9 |
| 6,497,169 | B1 * | 12/2002 | Khosla | 89/1.11 |
| 6,882,989 | B2 * | 4/2005 | Stevens | 706/13 |
| 7,089,193 | B2 * | 8/2006 | Newbold | 705/9 |
| 7,236,861 | B2 * | 6/2007 | Paradis et al. | 701/24 |
| 7,516,455 | B2 * | 4/2009 | Matheson et al. | 718/102 |
| 7,765,038 | B2 * | 7/2010 | Appleby et al. | 701/23 |
| 2005/0216324 | A1 * | 9/2005 | Maithell et al. | 705/8 |

OTHER PUBLICATIONS

Moss, Paula et al., Multi-mission Prioritiziation Using Cost-Based Mission Scheduling 11th ICCRTS, Coalition Command and Control in the Networked Era, 2006.*
Moss, Paula et al., Multi-mission Prioritiziation Using Cost-Based Mission Scheduling 11th ICCRTS, Coalition Command and Control in the Networked Era, 2006, PowerPoint Presentation.*
Santos, Eugene Jr. et al.. Achieving dynamic, multi-commander, multi-mission planning and execution Appl. Intell., vol. 25, 2006.*
Rui, Xu et al., Design for autonomous mission planning system Aircraft Engineering and Aerospace Technology, vol. 25, No. 4, 2003.*

(Continued)

Primary Examiner—Scott L Jarrett
(74) Attorney, Agent, or Firm—Tope-McKay & Assoc.

(57) ABSTRACT

Described is a system for multi-mission scheduling. The system is configured to compile a list of missions, where each mission includes at least one task. Additionally, each mission has a mission value associated with it such that the mission value reflects an ordering priority of the mission. The system also compiles a list of available resources that can be utilized to complete the tasks. The resources have, varying capabilities of completing tasks. Based on the lists, the system allocates and schedules the resources to complete tasks within the missions to maximize a total mission value of completed missions. Thus, the system schedules multiple missions to maximize the value of completed missions given available resources, whereby a mission is scheduled when the totality of its tasks have been allocated a sufficient amount of resources.

3 Claims, 16 Drawing Sheets

OTHER PUBLICATIONS

Goldman, Robert P. et al., MACBETH: A Multi-Agent Constraint Based Planner IEEE, 2002.*

Hillard, Michael R. et al., Scheudling the Operation Desert Storm Airlift: An Advanced Automated Scheduling Support System Interfaces, vol. 22, Jan.-Feb. 1992.*

Koepke, Corbin G., Multi-Mission Optimized Re-Planning In Air-Mobility Command's Channel Route Execution Massachusetts Institute of Technology, Jun. 2004, Abstract.*

Hillard, Michael R. et al., Scheduling the Operation Dessert Storm Airlight: An Advanced Automated Scheduling Support System, Interfaces, vol. 22, Jan.-Feb. 1992.*

Freed, Michael, Reactive Prioritization In Proceedings of the $2^{nd}$ NASA International Workshop on Planning and Scheduling in Space, 2000.*

Atkins, Ella M., Planning and Resource Allocation for Hard Real-time, Fault-Tolerant Plan Execution Kluwer, Oct. 9, 1999.*

Levine, David L. et al., Dynamic Scheduling Strategies for Avionics Mission Computing in Proceedings of the 17th IEEE/AIAA Digital Avionics Systems Conference, 1998.*

M.A. Becker, et al., "Mixed initiative resource management: The AMC Barrel allocator," In Proceedings of the Fifth International Conference on AI Planning and Scheduling, pp. 32-41, Breckenridge, CO, Apr. 2000.

S. Billups, et al., "Satellite mission scheduling with dynamic tasking," Mathematics Clinic, Univ. of Colorado, Denver. http://www-math.cudenver,edu/clinic/reports/ClinicReportSpring2005.pdf.gz, Spring 2005.

R. Cheng and M. Gen, "Evolution program for resource constrained project scheduling problem," in Proceedings of the First IEEE Conference on Evolutionary Computational Intelligence, 2, pp. 736-741, 1994.

T. Dean and M. Boddy, "An analysis of time-dependant planning," In Proceedings of the Sevent National Conference on Artificial Intelligence, pp. 49-54, Minneapolis, Minnesota, 1988.

J. Dorn, et al., "Comparison of iterative improvement techniques for schedule optimization," In European Journal of Operations Research, 94(2), pp. 349-361, 1996.

M. Hindsberger, et al., "Tabu search for target-radar allocation," Technical Report, IMM Publications, http://www2.imm.dtu.dk/pubdb/views/edoc_download.php/506/pdf/imm506.pdf, 1998.

E. Johnson, et al., "A high capacity object oriented mission scheduling system for XTE," In Astronomical Data Analysis Software and Systems V, pp. 463-466, 1996.

K. Mesghouni, et al., "Evolution programs for job-shop scheduling," In IEEE Transactions on Systems, Man, and Cybernetics, pp. 720-25, 1997.

L. Ozdamar, "A genetic algorithm approach to a general category project scheduling problem," In IEEE Transactions on Systems, Man, and Cybernetics—Part C: Applications and Reviews, 29(1), Feb. 1999.

G. Rabideau, et al., "Using iterative repair to automate planning and scheduling of shuttle payload operations," In Innovative Applications of Artificial Intelligence (IAAI), Orlando, FL, Jul. 1999.

S.J. Russell, "Composing real-time systems," In Proceedings of the Twelfth International Joint Conference on Artificial Intelligence, pp. 212-217, Sydney, Australia, 1991.

G. Shi, "A new encoding scheme for solving job shop problems by genetic algorithm," In Proceedings of the 35th Conference on Decision and Control, Kobe, Japan, Dec. 1996.

A. Shtub, et al., "Scheduling programs with repetitive projects: A comparison of a simulated annealing, a genetic and a pair-wise swap algorithm," In European Journal of Operations Research, 88, pp. 124-138, 1996.

T. Yamada, et al., "A simulated annealing approach to job shop scheduling using critical block transition operators," In Proceedings of the IEEE International Conference on Neural Networks (ICNN), pp. 4687-4692, 1994.

S. Zilberstein, "Optimizing Decision Quality with Contract Algorithms," In Proceedings of the Fourteenth International Joint Conference on Artificial Intelligence, pp. 1576-82, Montreal, Canada, 1995.

S. Zilberstein, "Using anytime algorithms in intelligent systems," In AI Magazine, 17(3), pp. 73-73, 1996.

* cited by examiner

| 402 | 400 |
|---|---|
| Globally Available Variables<br>M,T,Σ,d,T,S,R,B,D — as described for Mission Scheduling problem<br>Sched — schedule, initially empty<br><br>Auxiliary Functions — defined in specified figures or the Glossary section<br>*currentTime* — returns the current time<br>*determineBudgetSS* — determines time budget for next SS call<br>*SystematicSwap_top* — defined in FIG. 6<br>*determineBudgetSA* — determines time budget for next SA call<br>*getUnscheduledTasks* — determines which tasks to run SA on<br>*SimulatedAnnealing* — defined in FIG. 8<br>*setdifference* — returns the elements in first set but not in second<br><br>Input Parameters<br>TimeGoal — approximate time to spend filling schedule<br>N — number of failed missions to try to | Algorithm *TimeBudgetScheduling* (timegoal,n)<br>    timestart := *currentTime*()<br>    FailedM := [] /* a list of failed missions */<br>    Missions := *sort*( M by R(M) descending )<br>    for i = 1 to \|M\| do<br>        mission := Missions(i) /* next-highest-reward mssn*/<br>        for each task in T(mission)<br>            budget := *determineBudgetSS*(<br>                mission, *currentTime*()-timestart,timegoal)<br>            *SystematicSwap_top*(task,budget)<br>            /* try to schedule task */<br>        end for<br>        if any of mission's tasks still unscheduled and<br>        time permits then<br>            FailedM(end+1) := mission<br>            /* add mission to list of failed mssns */<br>            LastM=FailedM(end-n+1:end)<br>            /* the last n mssns in list */<br>            budget := *determineBudgetSA*(<br>                LastM,*currentTime*()-timestart,timegoal)<br>            FailedTasks := *getUnscheduledTasks*(LastM)<br>            [improved,SchedM,NewFailedM] :=<br>                *SimulatedAnnealing*(FailedTasks,budget)<br>            if improved then<br>                FailedM := *setdifference*(FailedM,SchedM)<br>                /* removed sched mssns */<br>                FailedM := [FailedM,NewFailedM]<br>            end if<br>        end if<br>    end for<br>end algorithm |

FIG. 4

| Auxiliary Functions – defined in Appendix | | Algorithm SimulatedAnnealing (newtasks,budget) |
|---|---|---|
| getSchedVal | - return sum of values of successfully scheduled missions | Schedule := Sched /* begin with global schedule */<br>timestart := currentTime()<br>OldSched := Schedule<br>oldscore := 1000*getSchedVal(OldSched)<br>    +getNumTasksSched(OldSched) |
| getNumTasksSched | - determine number of tasks in a schedule | TaskList := [getMobileTasks(NewTasks),NewTasks]<br>pInitial := 0.99<br>pFinal := 0.0001 |
| getMobileTasks | - determine which in schedule conflict with given tasks | nIters := budget/0.0025 /* 0.0025, guess at iter. runtime */<br>delta := pFinal^(1/nIters)<br>p := pInitial<br>iter := 0 |
| getAvailLocs | - determine available locations for a given task | while iter<nIters do<br>    iter := iter+1<br>    NewSched := OldSched<br>    task := randomly choose one of TaskList<br>    AvailLocs := getAvailLocs(task,NewSched) |
| isScheduled | - is the task currently in the given schedule |     if isScheduled(task,NewSched) then<br>        loc := randomly choose one of<br>            AvailLocs U {unschedule} |
| moveTask | - move task to location in schedule |     else<br>        loc := randomly choose one of AvailLocs<br>    end if<br>    NewSched := moveTask(NewSched,task,loc)<br>    newscore := 1000*getSchedVal(NewSched)<br>        +getNumTasksSched(NewSched) |
| Input Parameters | |     if (newscore>oldscore) OR (with probability p) then |
| NewTasks | - list of tasks to try to add to global schedule |         OldSched := NewSched<br>        oldscore := newscore |
| budget | - time budget |     end if<br>    rate := (currentTime()-timestart)/iter<br>    nIters := budget/rate<br>    delta := pFinal^(1/nIters)<br>    p := p*delta<br>end while<br>if getSchedVal(OldSched) > getSchedVal(Sched)<br>    Sched := OldSched<br>endif<br>end algorithm |

FIG. 8

| Scenario | Running time | | | |
|---|---|---|---|---|
| | 1xGreedy (1200, 1202) | 2xGreedy | 4xGreedy (1204) | 8xGreedy (1206) |
| 50 missions, 2 sensors | 3.2% | 8.3% | 11.9% | 15.1% |
| 100 missions, 3 sensors | 3.7% | 6.6% | 11.0% | 13.9% |
| 200 missions, 5 sensors | 3.8% | 7.7% | 11.5% | 14.8% |
| 300 missions, 6 sensors | 4.0% | 7.5% | 10.1% | 13.5% |

FIG. 12

SYSTEM AND METHOD FOR MULTI-MISSION PRIORITIZATION USING COST-BASED MISSION SCHEDULING

FIELD OF INVENTION

The present invention relates to a scheduling system and, more particularly, to a system for automatically allocating and scheduling resources to accomplish multiple missions so as to maximize desired objectives.

BACKGROUND OF INVENTION

Mission Scheduling (MS) is a problem that arises in the management of networks of heterogeneous resources, such as sensor and satellite networks. In this context, a mission is a collection of tasks that can each be executed by some subset of the resources.

Various commercial off-the-shelf (COTS) products are available as prior art for scheduling problems. Such products include manufacturing and integer programming (IP) products. However, these have no proven history with MS-sized problems and major modifications may be needed to address MS. In addition, COTS adds risk-of-lifecycle costs. Prior algorithms such as greedy (task-based algorithms) and meta-heuristics approaches have been developed for scheduling problems. Again, these have mostly been applied to smaller-sized problems and significant modifications may be needed to make them scale to larger problems and still be able to provide near-optimal solutions. Additionally, the non-COTS approaches do not generally have built-in time-budgeting mechanisms.

As briefly described above, one aspect of scheduling is related to manufacturing problems and supply chain management. Commercial products are available from Manugistics Inc., Ariba, and i2 Technologies Inc., though these tools tend to be specifically tailored to the demands of manufacturing industries. Major modifications would be necessary to apply the techniques used in these products to MS and even then, these tools would not necessarily work on problems with the scale of MS. Manugistics Inc. is located at 9715 Key West Avenue, Rockville, Md. 20850. Ariba is located at 807 11th Avenue, Sunnyvale, Calif. 94089. Additionally, i2 Technologies Inc. is located at One i2 Place, 11701 Luna Road, Dallas, Tex. 75234.

Integer programming (IP) is the method typically used for finding optimal solutions to all sorts of difficult scheduling problems. High-quality, commercially-available solvers (such as ILOG's OPL/CPLEX software, Dash Optimization's Xpress-MP software, and Optimal Solution Technologies' IBM/OSL software) make IP a desirable framework for solving scheduling problems. ILOG Inc. is located at 1080 Linda Vista Avenue, Mountain View, Calif. 94043. Dash Optimization Inc. is located at 560 Sylvan Avenue, Englewood Cliffs, N.J. 07632. Optimal Solution Technologies Inc. is located at P.O. Box 201964, Shaker Heights, Ohio 44120-1964. The problem with these solvers is that large-sized problems cannot be solved in a reasonable amount of time. Most IP solvers rely on branch-and-bound or similar techniques which can include an exponential number of variables. An instance of MS will often have millions of variables, making IP, as well as any optimal approach, infeasible. As described in further detail below, Billups et al. conducted a thorough investigation of using IP techniques to solve a simpler version of MS. The study confirmed that none but the simplest of problems can be solved optimally using IP.

Optimal techniques for scheduling problems (e.g., branch-and-bound) can have an exponential running time in the number of available timeslots for scheduling tasks. Some instances of the MS problem can include millions of timeslots. Thus, finding optimal solutions is completely infeasible. As can be appreciated by one skilled in the art, the scale of MS problems is large, even for suboptimal solution techniques. Though little work has been done on MS itself, algorithms for solving related problems have been limited to a much smaller scale. For example, a problem having 2500 timeslots was described by E. Johnson and A. Antunes, in an article entitled, "A high capacity object oriented mission scheduling system for XTE," in *Astronomical Data Analysis Software and Systems V*, pp. 463-466, 1996.

Other systems have attempted scheduling using greedy and genetic algorithm (GA)-based approaches. However, they have been limited to simpler versions of MS. For example, Billups et al. developed several GA algorithms for a satellite scheduling problem that is similar to MS. However, it only included a single resource (which makes IP methods much more tractable) and allowed for less freedom in how the different tasks of a single mission can be scheduled. The developments by Billups et al. were described in a publication entitled, "Satellite payload scheduling with dynamic tasking," in Mathematics Clinic, Univ. of Colorado, Denver, found at http://www.math.cudenver.edu/clinic/reports/ClinicReportSpring2005.pdf.gz, Spring 2005.

Similarly, Becker and Smith developed an incremental approach to a problem that looks similar to MS but is extremely domain-dependant. Therefore, their positive results do not generally translate to MS. The Becker and Smith approach was described in a publication entitled, "Mixed initiative resource management: The AMC Barrel Allocator," in *Proceedings of the Fifth International Conference on AI Planning and Scheduling*, pp. 32-41, Breckenridge, Co., April 2000.

Because of the inherent difficulty and large size of most real-world scheduling problems, most research has focused on suboptimal, meta-heuristic algorithms. Rabideau et al. and Dorn et al. discuss techniques for solving difficult scheduling problems through the processes of iterative improvement and repair. Rabideau et al. is a publication authored by G. Rabideau, S. Chien, J. Willis, and T. Mann, entitled, "Using iterative repair to automate planning and scheduling of shuttle payload operations," in *Innovative Applications of Artificial Intelligence (IAAI)*, Orlando, Fla., July 1999. Additionally, Dorn et al. is a publication authored by J. Dorn, M. Girsch, G. Skele, and W. Slany, entitled, "Comparison of iterative improvement techniques for schedule optimization," in *European Journal of Operations Research*, 94(2), pp. 349-61, 1996. Such techniques recognize that solutions can be found quickly by building them in an iterative fashion. While the techniques described above provide a fundamental foundation for applying techniques like Genetic Algorithms (GA) and Tabu Search to automatic scheduling problems, much of their gains are lost when applying them to a problem like MS. Such techniques were not explicitly designed to solve an MS problem. This is a common problem in applying prior art in scheduling domains, as performance is degraded when general methods are applied to specific problems and domain-dependant advances do not often translate to even slightly different problems.

A lot of prior work has been completed using GAs for scheduling problems. By way of example, Shi et al. describes a GA approach to Job Shop Scheduling problems, while Ozdamar, Dorn et al., and Shtub et al. propose GA approaches to more general scheduling problems. Shi et al. is a publication authored by G. Shi, H. Iima, and N. Sannomiya, entitled, "A new encoding scheme for solving job shop problems by genetic algorithm," in *Proceedings of the 35th Conference on Decision and Control*, Kobe, Japan, December 1996. Ozdamar is a publication authored by L. Ozdamar, entitled, "A genetic algorithm approach to a general category project scheduling problem," in *IEEE Transactions on Systems, Man, and Cybernetics—Part C: Applications and Reviews*, 29(1), February 1999. Shtub et al. is a publication authored by A. Shtub, L. J. LeBlanc, and Z. Cai, entitled, "Scheduling programs with repetitive projects: A comparison of a simulated annealing, a genetic and a pair-wise swap algorithm," in *European Journal of Operations Research*, 88, pp. 124-38, 1996.

Though using GAs is a promising technique, its incarnations in prior work have limited applicability to MS because of fundamental differences in the objective functions and constraints for which they were developed. There has also been work on scheduling with evolution programs (i.e., Cheng and Gen, and Mesghouni et al.), though such work suffers from the same limitations as GA when applied to MS. Cheng and Gen is a publication authored by R. Cheng and M. Gen, entitled, "Evolution program for resource constrained project scheduling problem," in *Proceedings of the First IEEE Conference on Evolutionary Computational Intelligence*, 2, pp. 736-41, 1994. Additionally, Mesghouni et al. is a publication authored by K. Mesghouni, S. Hammadi, and P. Borne, entitled, "Evolution programs for job-shop scheduling," in *IEEE Transactions on Systems, Man, and Cybernetics*, pp. 720-25, 1997.

Simulated Annealing (SA) is a technique used by the present invention that also appears throughout the literature. For example, Yamada et al. describes tailoring SA to Job Shop Scheduling, while Hindsberger et al. describes its application to Target-Radar allocation. Yamada et al. is a publication authored by T. Yamada, B. E. Rosen, and R. Nakano, entitled, "A simulated annealing approach to job shop scheduling using critical block transition operators," in *Proceedings of the IEEE International Conference on Neural Networks (ICNN)*, pp. 4687-92, 1994. Hindsberger et al. is a publication authored by M. Hindsberger and R. V. V. Vidal, entitled, "Tabu search for target-radar allocation," in Technical Report, IMM Publications, which can be found at http://www2.imm.dtu.dk/pubdb/views/edoc_download.php/506/pdf/imm506.pdf, 1998.

Job Shop Scheduling is a fundamentally different scheduling problem than MS. Methods for solving Job Shop Scheduling do not necessarily work well for MS, and vice versa. Hindsberger and Vidal concluded that a Tabu Search algorithm worked better than SA for their particular problem because of the limited amount of "cooling time" they could afford to give their SA algorithm.

One of the problems with relying on prior work for MS solvers is the difficulty with preserving solution quality when translating the intended scheduling problem to MS. A possible way of resolving this is to focus on a simpler version of MS that includes only missions with a single task. This task-based scheduling has much more in common with more general scheduling problems and should therefore have more success in utilizing existing solution techniques. However, research has indicated that while task-based techniques are easy to implement and often more intuitive, the solutions are often very low quality. Thus, techniques tailored for MS far out perform the simpler task-based techniques.

The prior art mentioned above is limited and incomplete because it cannot solve MS-sized problems with the desired optimization objectives. Thus, a continuing need exists for a system that addresses the need of solving MS-sized problems, yet still provides a high quality solution.

SUMMARY OF INVENTION

The present invention relates to a method for scheduling. The method comprises acts of identifying a mission having at least one task; compiling a list of available resources, the available resources being usable for completing tasks and having varying capabilities of completing tasks; and allocating and scheduling the available resources to complete at least one task within the mission.

The present invention also relates to a method for multi-mission scheduling. The method further comprises additional acts, such as compiling a list of a plurality of missions. Each of the missions includes at least one task and has a mission value associated with it such that the mission value reflects an ordering priority of the mission. The method also includes an act of compiling a list of available resources that are usable for completing the tasks. The method also includes acts of allocating and scheduling the available resources to complete tasks within the missions to maximize a total mission value of completed missions, thereby scheduling multiple missions to maximize the value of completed missions given available resources. Thus, a mission is scheduled when the totality of its tasks have been allocated a sufficient amount of resources.

In another aspect, the act of allocating the available resources further comprises an act of allocating and scheduling the available resources to tasks within the missions, one-at-a-time, until a mission is scheduled, in a decreasing order of mission value.

Additionally, the act of allocating the available resources farther comprises acts of:
  identifying a mission with the largest mission value;
  identifying whether the mission includes a task that needs additional resources in order to complete the task;
    when the mission includes a task that need additional resources, identifying and scheduling the available resources that can complete the task;
    when the resources that can complete the task are unavailable, then proceed to the mission with the next largest mission value and repeat the procedure beginning with identifying whether the mission includes any tasks that need additional resources; and
  when all tasks in the mission have been allocated a sufficient amount of resources, then the mission has been successfully scheduled, then identifying the mission with the next largest mission value and repeating the above procedure beginning with identifying whether the mission includes any tasks that need additional resources.

In yet another aspect, the act of allocating the available resources further comprises acts of:
  attempting to allocate and schedule the available resources to tasks within the missions, one-at-a-time, in a decreasing order of mission value;
  when tasks in a first mission still need resources, then re-allocating previously scheduled resources to the tasks; and
  re-allocating resources amongst tasks in different missions to maximize the value of completed missions.

In another aspect, the act of allocating the available resources further comprises acts of:
  identifying a mission with the largest mission value;
  identifying whether the mission includes any tasks that have yet to be considered and that need additional resources in order to complete the task;

when the mission includes a task that has yet to be considered and that needs additional resources, identifying and scheduling the available resources that can complete the task, then identifying the mission with the next largest mission value and repeating the above procedure beginning with identifying whether the mission includes any tasks that need additional resources;

when the resources that can complete the task are unavailable, then performing an iteration of re-allocating resources amongst the tasks until can either schedule the task with a resource or a predetermined number of iterations is exhausted, and if exhausted, then the task is a failed task;

when all tasks in the mission have been allocated a sufficient amount of resources, then identifying the mission with the next largest mission value and repeating the above procedure beginning with identifying if the mission includes any tasks that need additional resources;

identifying if there are any failed tasks;

when all tasks in the mission have been scheduled, then identifying the mission with the next largest mission value and repeating the above procedure beginning with identifying if the mission includes any tasks that need additional resources;

when there is at least one failed task, then identifying and scheduling the available resources that can complete the task;

when the resources that can complete the task are unavailable, then add the task to a list of unscheduled tasks and perform the following acts:

identifying a perturbed list, the perturbed list comprising all tasks in the schedule that are currently allocated resources that are sufficient to complete a task in the list of unscheduled tasks;

generating a first value of the schedule choosing a task at random from a list selected from a group consisting of the perturbed list and the list of unscheduled tasks;

when the task chosen is from the perturbed list, then de-allocating its resources, and if possible, re-allocate other resources chosen at random to the task, and if not possible, remove the task from the perturbed list and put it in the unscheduled list because it no longer has resources allocated to it;

when the task chosen is from the list of unscheduled tasks, then allocating resources chosen at random to the task and move it from the unscheduled list to the perturbed list;

generating a second value of the schedule;

comparing the first value to the second value;

when the second value is greater than the first value, then keeping the schedule corresponding to the second value, then identifying the mission with the next largest mission value and repeating the above procedure beginning with identifying whether the mission includes any tasks that need additional resources; and when the first value is greater than the second value, then reverting to the schedule that corresponds to the first value, then repeating the above procedure beginning with identifying a perturbed list, such that the procedure is repeated until a predetermined probability threshold is reached.

Additionally, the act of allocating the available resources further comprise an act of rescheduling previously scheduled resources to other tasks if unable to schedule all the tasks with resources in a particular mission.

In yet another aspect, the act of allocating the available resources further comprises acts of:

identifying the mission with the largest mission value;

identifying whether the mission includes a task that needs additional resources in order to complete the task;

when the mission includes a task that needs additional resources, identifying and scheduling the available resources that can complete the task, then identifying the mission with the next largest mission value and repeating the above procedure beginning with identifying whether the mission includes a task that needs additional resources;

when the resources that can complete the task are unavailable, then performing an iteration of re-allocating resources among the tasks until can either schedule the task or a predetermined number of iterations is exhausted; and when all tasks in the mission have been allocated a sufficient amount of resources, then identifying the mission with the next largest mission value and repeating the above procedure beginning with identifying whether the mission includes a task that needs additional resources.

Additionally, the act of allocating the available resources further comprises an act of re-allocating resources amongst tasks in different missions to maximize the value of completed missions.

In another aspect, the act of allocating the available resources further comprises acts of:

identifying the mission with the largest mission value;

identifying whether the mission includes a task that needs additional resources in order to complete the task;

when the mission includes a task that needs additional resources, identifying and scheduling the available resources that can complete the task, then identifying the mission with the next largest mission value and repeating the above procedure beginning with identifying if the mission includes a task that needs additional resources;

when the resources that can complete the task are unavailable, then add the task to a list of unscheduled tasks and perform the following acts:

identifying a perturbed list, the perturbed list comprising all tasks in the schedule that are currently allocated resources that are sufficient to complete a task in the list of unscheduled tasks;

generating a first value of the schedule choosing a task at random from a list selected from a group consisting of the perturbed list and the list of unscheduled tasks;

when the task chosen is from the perturbed list, then de-allocating its resources, and if possible, re-allocate other resources chosen at random to the task, and if not possible, remove the task from the perturbed list and put it in the unscheduled list because it, no longer has resources allocated to it;

when the task chosen is from the list of unscheduled tasks, then allocating resources chosen at random to the task and move it from the unscheduled list to the perturbed list;

generating a second value of the schedule;

comparing the first value to the second value;

when the second value is greater than the first value, then keeping the schedule corresponding to the second value, then identifying the mission with the next largest mission value and repeating the above procedure beginning with identifying whether the mission includes a task that needs additional resources; and when the first value is greater than the second value, then reverting to the schedule that corresponds to the first value, then repeating the above procedure beginning with identifying a perturbed list, such that the procedure is repeated until a predetermined probability threshold is reached.

Furthermore, the act of allocating the available resources further comprises an act of specifying a global time-budget for allocating available resources to complete missions to maximize a total mission value.

Additionally, the act of allocating the available resources further comprises acts of:

identifying the mission with the largest mission value;

identifying whether the mission includes a task that needs additional resources in order to complete the task;

when the mission includes a task that needs additional resources, identifying and scheduling the available resources that can complete the task, then identifying the mission with the next largest mission value and repeating the above procedure beginning with identifying if the mission includes any tasks that need additional resources;

when the resources that can complete the task are unavailable, then specifying a task-specific time-budget for the first task, the task-specific time-budget being based on the amount of time remaining in the global time-budget and the value of the mission the first task belongs to, then re-allocating resources among the tasks until can either schedule the task or the task-specific time-budget is exhausted; and when all tasks in the mission have been allocated a sufficient amount of resources, then identifying the mission with the next largest mission value and repeating the above procedure beginning with identifying whether the mission includes a task that needs additional resources.

In yet another aspect, the act of allocating the available resources further comprises acts of:

identifying the mission with the largest mission value;

identifying whether the mission includes a task that needs additional resources in order to complete the task;

when the mission includes a task that needs additional resources, identifying and scheduling the available resources that can complete the task, then identifying the mission with the next largest mission value and repeating the above procedure beginning with identifying if the mission includes a task that needs additional resources;

when the resources that can complete the task are unavailable, then add the task to a list of unscheduled tasks and specifying a task-specific time-budget for the task, the task-specific time-budget being based on the amount of time remaining in the global time-budget, the value of the missions represented by the tasks in the list of unscheduled tasks, and the number of tasks in the list, and perform the following acts:

identifying a perturbed list, the perturbed list comprising all tasks in the schedule that are currently allocated resources that are sufficient to complete a task in the list of unscheduled tasks;

generating a first value of the schedule choosing a task at random from a list selected from a group consisting of the perturbed list and the list of unscheduled tasks;

when the task chosen is from the perturbed list, then de-allocating its resources, and if possible, re-allocate other resources chosen at random to the task, and if not possible, remove the task from the perturbed list and put it in the unscheduled list because it no longer has resources allocated to it;

when the task chosen is from the list of unscheduled tasks, then allocating resources chosen at random to the task and move it from the unscheduled list to the perturbed list;

generating a second value of the schedule;

comparing the first value to the second value;

when the second value is greater than the first value, then keeping the schedule corresponding to the second value, then identifying the mission with the next largest mission value and repeating the above procedure beginning with identifying if the mission includes any tasks that need additional resources; and when the first value is greater than the second value, then reverting to the schedule that corresponds to the first value, then repeating the above procedure beginning with the act of identifying a perturbed list, such that the procedure is repeated until a predetermined probability threshold is reached, where the predetermined probability threshold is dependent upon the task-specific time-budget.

In another aspect, the act of allocating the available resources further comprises acts of:

identifying a mission with the largest mission value;

identifying whether the mission includes a task that has yet to be considered and that needs additional resources in order to complete the task;

when the mission includes a task that has yet to be considered and that needs additional resources, identifying and scheduling the available resources that can complete the task, then identifying the mission with the next largest mission value and repeating the above procedure beginning with the act of identifying if the mission includes any tasks that need additional resources;

when the resources that can complete the task are unavailable, then specifying a task-specific time-budget for the scheduling task, the task-specific time-budget being based on the amount of time remaining in the global time-budget and the value of the mission the task belongs to, then re-allocating resources among the tasks until can either schedule the task or the task-specific time-budget is exhausted, and if the task-specific time-budget is exhausted, then the task is a failed task;

when all tasks in the mission have been allocated a sufficient amount of resources, then identifying the mission with the next largest mission value and repeating the above procedure beginning with the act of identifying whether the mission includes a task that needs additional resources;

identifying whether there are any failed tasks;

when all tasks in the mission have been scheduled, then identifying the mission with the next largest mission value and repeating the above procedure beginning with the act of identifying whether the mission includes a task that needs additional resources;

when there is at least one failed task, then identifying and scheduling the available resources that can complete the task;

when the resources that can complete the task are unavailable, then add the task to a list of unscheduled tasks and perform the following acts:

identifying a perturbed list, the perturbed list comprising all tasks in the schedule that are currently allocated resources that are sufficient to complete a task in the list of unscheduled tasks;

generating a first value of the schedule choosing a task at random from a list selected from a group consisting of the perturbed list and the list of unscheduled tasks;

when the task chosen is from the perturbed list, then de-allocating its resources, and if possible, re-allocate other resources chosen at random to the task, and if not possible, remove the task from the perturbed list and put it in the unscheduled list because it no longer has resources allocated to it;

when the task chosen is from the list of unscheduled tasks, then allocating resources chosen at random to the task and move it from the unscheduled list to the perturbed list;

generating a second value of the schedule;

comparing the first value to the second value;

when the second value is greater than the first value, then keeping the schedule corresponding to the second value, then identifying the mission with the next largest mission value and repeating the above procedure beginning with identifying whether the mission includes a task that needs additional resources; and when the first value is greater than the second value, then reverting to the schedule that corresponds to the first value, then repeating the above procedure beginning with the act of identifying a perturbed list, such that the procedure is repeated until a predetermined probability threshold is reached, where the predetermined probability threshold is dependent upon the task-specific time-budget.

Finally, as can be appreciated by one skilled in the art, the present invention also includes a system and computer program product. The system is computer system that is configured to perform the acts and operations described herein. The computer program product comprises computer-readable instruction means stored on a computer-readable medium that are executable by a computer for causing the computer to perform the operations of the present invention.

BRIEF DESCRIPTION OF THE DRAWINGS

The objects, features and advantages of the present invention will be apparent from the following detailed descriptions of the various aspects of the invention, in conjunction with reference to the following drawings, where:

FIG. 4 is a pseudo-code listing of an exemplary algorithm that calls upon Systematic Swapping and Simulated Annealing algorithms to find the best schedule it can;

FIG. 8 is a pseudo-code listing of an exemplary Simulated Annealing algorithm that tries to improve the schedule by introducing multiple tasks at once;

FIG. 12 is a table illustrating exemplary improvements as a percentage of total mission value scheduled compared to results from a Greedy approach, taken over fifty Monte Carlo runs;

DETAILED DESCRIPTION

Figure 1:
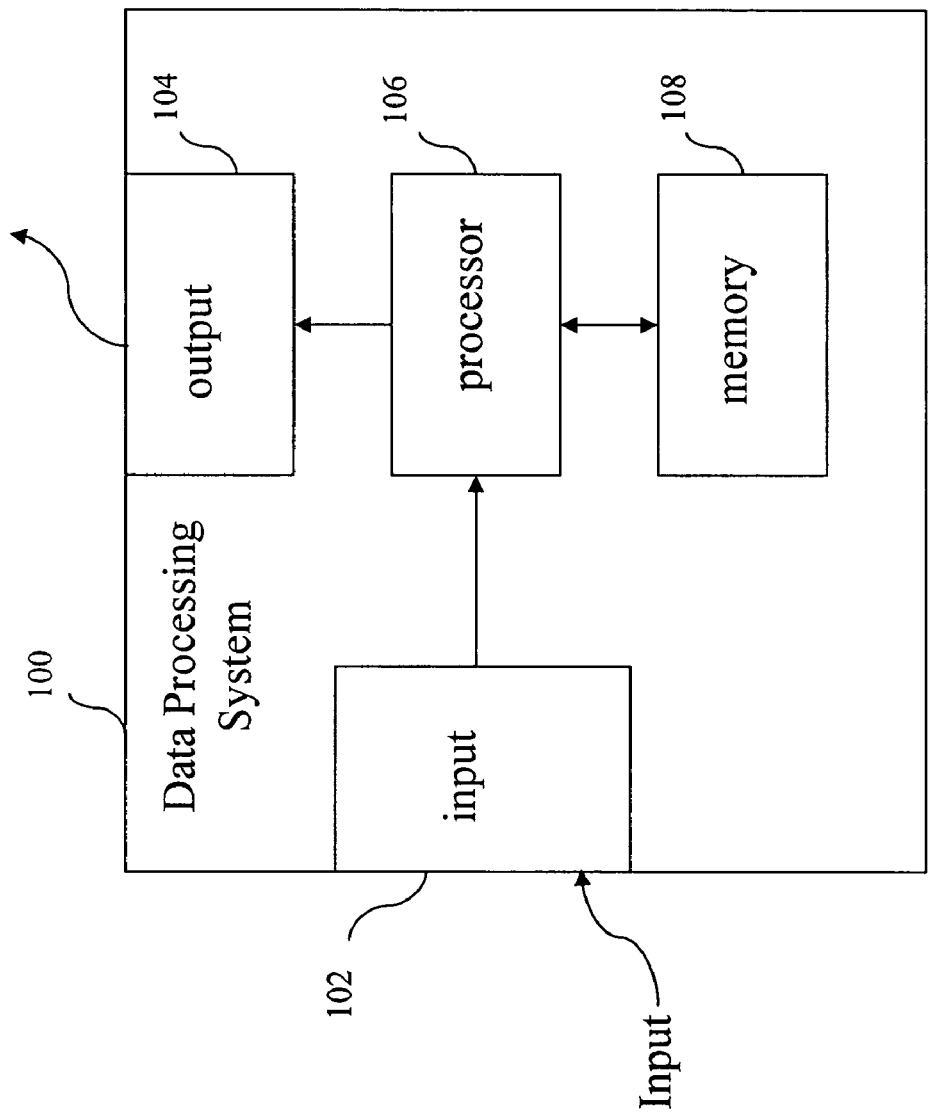
FIG. 1 is a block diagram, illustrating a system for multi-mission scheduling.

The present invention relates to a scheduling system and, more particularly, to a system for automatically allocating and scheduling resources to accomplish multiple missions so as to maximize desired objectives. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a glossary of terms used in the description and claims is provided. Next, a description of various principal aspects of the present invention is provided. Subsequently, an introduction provides the reader with a general understanding of the present invention. Finally, details of the present invention are provided to give an understanding of the specific aspects.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Figure 7:
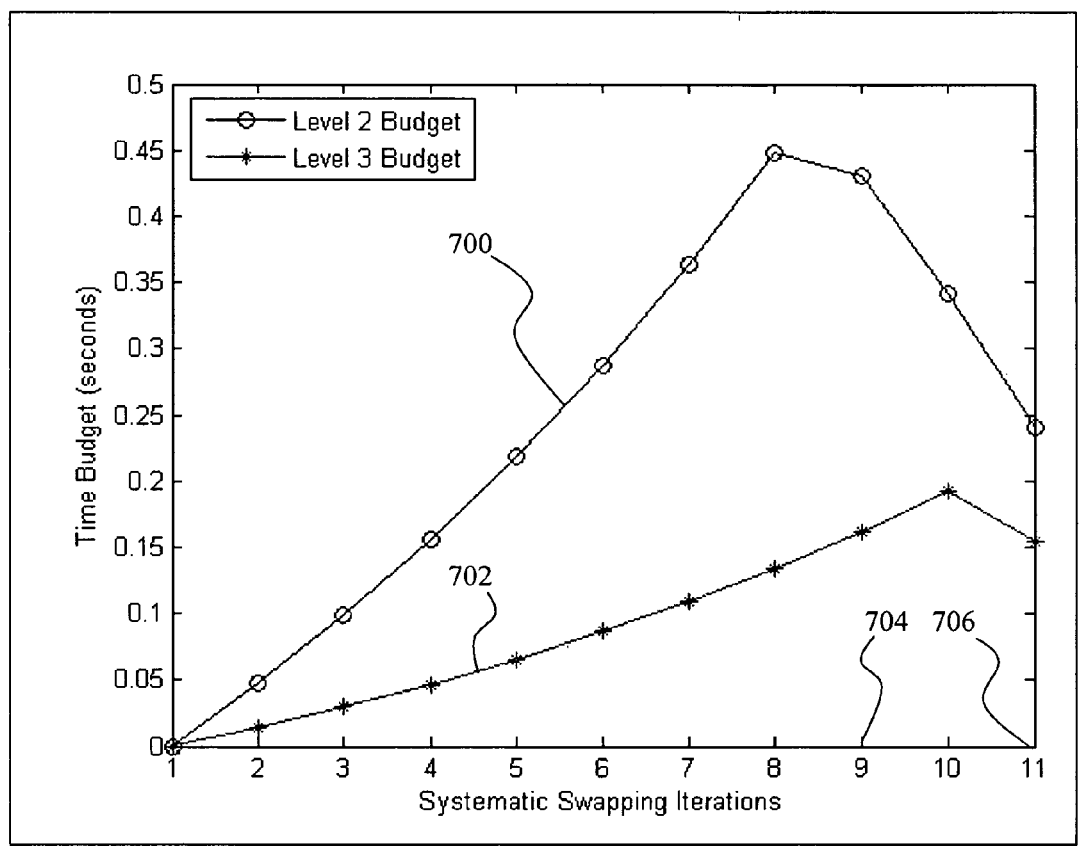
FIG. 7 is a graph illustrating exemplary progressions of two time-budgets over several iterations of the Systematic Swapping algorithm.

Auxiliary Function—The term "auxiliary function" as used with respect to this invention is a function that is written to perform some task, or do the work of another function. The algorithms of the present invention use a plurality of auxiliary functions. Examples and definitions of the auxiliary functions used herein are as follows:

currentTime( )
   A function that returns the system time.

determineBudgetSA (FailedMissions, timeused, timegoal)
   This function determines the amount of time to allow for the next call to SimulatedAnnealing, which will try to improve the schedule with the addition of some unscheduled tasks belonging to the missions in FailedMissions. As with determineBudgetSS, this function determines the "available" time, then allots a portion of that determined by equation (4).

determineBudgetSS (mission, timeused, timegoal)
   This function determines the amount of time to allow for the next call to SystematicSwap, which will be trying to schedule a task from the given mission. This function is actually a bit more involved that it appears in the pseudo-code. As described in Section 4.4.2, the function first determines the "available" time. The available time is the time remaining until the goal is reached less the expected time needed to simply insert all remaining tasks into the schedule. Then a portion of that is allotted as determined by equation (3).

getAvailLocs (task, Schedule)
   This function returns a list of resource/time-interval pairs that are available in the given schedule and in which the given task can be scheduled.

getConflictingTasks (resource, interval)
   This function returns a list of all tasks that are currently scheduled on the given resource within the given interval in the global schedule (Sched).

getMobileTasks (TaskList)
   This function returns a list of tasks that are currently present in the global schedule (Sched) on a resource and at a time that intersects with where any of the tasks in the given list can be scheduled.

getNumTasksSched (Schedule)
   This function returns the number of tasks currently present in the given schedule.

getSchedVal (Schedule)
   This function returns the sum of the values of the successfully scheduled missions in the given schedule.

getUnscheduledTasks (FailedMissions)
   This function returns a list of the tasks belonging to the missions in FailedMissions that are not currently in the global schedule (Sched).

incrementBudget (Budget)
   This function increases the budgets of levels 2 and 3 according to the method described in Section 4.4.3, with exemplary results illustrated in FIG. 7.

insertTask (task, AvoidList)
   AvoidList contains a list of time-intervals/resource pairs where tasks should not be scheduled. This function tries to find an available location in the global schedule (Sched) where a task can be inserted without conflicting with AvoidList. If a valid location is found, then task is inserted into the schedule.

Scheduled (task, Schedule)
   This function determines whether the given task is currently present in the given schedule.

moveTask (Schedule, task, location)
   This function updates the given schedule to move the given task from its current location (if any) to the given location (resource/time-interval pair).

Setdifference (SetA, SetB)
   This function returns a set containing those elements in SetA that are not in SetB.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e., computer operations coded into a computer chip). The "instruction means" may be stored in the memory of a computer or on a computer-readable medium such as a floppy disk, a CD-ROM, and a flash drive.

Mission—The term "mission" as used with respect to the present invention is a collection of tasks that can each be executed by some subset of the resources.

Resource—The term "resource" as used with respect to the present invention is a mechanism or device that is used to run and complete tasks. Each resource can only run a single task at a time, such that a schedule dictates which resources will run which tasks at what times. Additionally, the resources can be uniform, or can having varying capabilities of completing tasks.

Tasks—The term "tasks" as used with respect to the present invention is a job that is run on a resource. Each task can only be run on some predefined subset of the resources. Additionally, each task can only be run within some predefined time window and takes some predefined duration to complete.

(2) Principal Aspects

The present invention has three "principal" aspects. The first is a multi-mission scheduling system. The multi-mission scheduling system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting the components of a multi-mission scheduling system of the present invention is provided in FIG. 1. The scheduling system 100 comprises an input 102 for receiving information regarding various missions and resources. Note that the input 102 may include multiple "ports." Typically, input is received from a user or other systems, a non-limiting example of which include another computer that monitors task, missions, and/or resources. An output 104 is connected with the processor for providing information regarding the resources, tasks, and missions to a user and/or to other systems in order that a network of computer systems may serve as a multi-mission scheduling system. Output may also be provided to other devices or other programs; e.g., to other software modules, for use therein. The input 102 and the output 104 are both coupled with a processor 106, which may be a general-purpose computer processor or a specialized processor designed specifically for use with the present invention. The processor 106 is coupled with a memory 108 to permit storage of data and software that are to be manipulated by commands to the processor 106.

Figure 2:
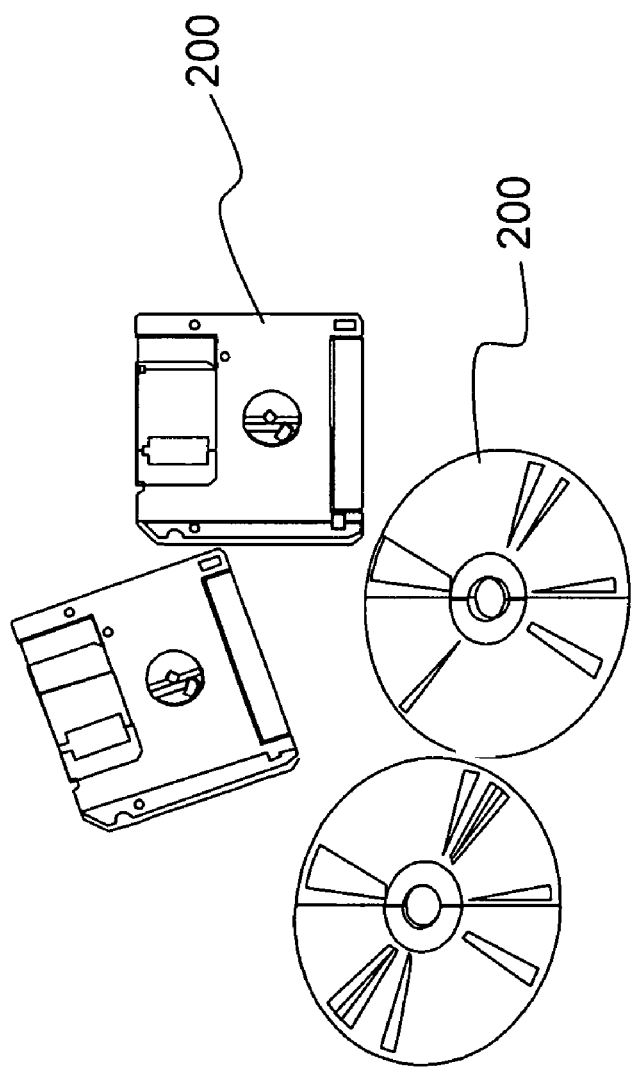
FIG. 2 is an illustration of a computer program product according to the present invention.

An illustrative diagram of a computer program product embodying the present invention is depicted in FIG. 2. The computer program product 200 is depicted as an optical disk such as a CD or DVD. However, as mentioned previously, the computer program product generally represents computer-readable instructions stored on any compatible computer-readable medium.

(3) Introduction

The present invention describes a method, system, and computer program product for multi-mission scheduling. In other words, the present invention automatically allocates and schedules resources to accomplish multiple missions so as to maximize desired objectives. Mission scheduling (MS) is a problem that arises in the management of networks of heterogeneous resources, such as sensor and satellite networks. In this context, a mission is a collection of tasks that can each be executed by some subset of the resources. The present invention addresses both the optimization of mission-resource or task-resource pairing as well as the optimization of scheduling times. Some key aspects of the present invention include: (1) a time-budget based fast and near-optimal hybrid algorithm and system thereof for maximizing scheduled mission: value; and (2) a set of algorithms with different speed, optimality, and associated intelligent budgeting of time that constitute the hybrid algorithm for accomplishing the scheduling.

The hybrid algorithm uses a combination of greedy metaheuristics with a systematic local search and simulated-annealing type algorithms to build a high-quality solution to a MS problem. It considers all temporal and resource constraints, such that the resources will actually be able to accomplish the missions assigned to them.

While there are several currently available component off-the-shelf (COTS) resource allocation and scheduling engines, they are extremely slow for large mission scheduling problems (such as the ones solved by the present invention (e.g., ~1000 missions, ~3000-5000 tasks, ~30-50 resources, ~24 hr scheduling period)). Additionally, currently available engines do not have the capability for generating Just-In-Time (JIT) solutions. The present invention addresses not only very large problem sizes, but also provides progressively better solutions as the time-budget is increased.

Multi-mission prioritization and scheduling is an essential part of the modern environment. The focus on joint operations and the ability to share operational data in a net-centric environment has created a dynamic space where one asset may have several operational missions to support.

Thus, the proposed invention is well-suited for applications that require allocation and scheduling of resources to satisfy one or more time critical objectives. Non-limiting examples of such applications include job-shop scheduling, sensor management, military planning, network management, satellite scheduling, etc. In all of these problem domains, limited time-critical resources need to be allocated to optimize one or more objectives. The present invention can be integrated into these systems as it is an all-software solution. Other modifications can be made without major development, effort, and time.

(4) Details of the Invention

Mission Scheduling (MS) is a problem that arises in the management of networks of heterogeneous resources, such as sensor and satellite networks. An instance of the mission scheduling problem will include a set of missions of different priorities. To successfully schedule a mission, a schedule must be found over the system resources that accomplishes all of the mission's tasks. Each task has constraints on which resources it can be scheduled on, when it can be scheduled, and how long it will occupy the assigned resource. Problem instances are frequently inconsistent; that is, it is not necessarily possible to successfully schedule all of the missions. It is thus the goal of a mission scheduler to find a schedule that maximizes the combined value (priority) of successfully scheduled missions.

An optimal mission schedule is one that, for a given set of missions, tasks, resources, and constraints, maximizes the sum of the values of the scheduled missions. Finding optimal solutions for problems of any reasonable size is computationally infeasible, though there are a variety of suboptimal techniques that can be employed. When choosing among these techniques, the tradeoff between runtime and solution quality must be considered. It is desirable to get the best possible schedule as quickly as possible. Unfortunately, that is rarely an option. Instead, decisions must typically be made between "faster" methods and "better" methods, without any general way of weighing the two criteria. Such limitations reduce the ability to identify an objectively "best" algorithm. However, in practice, there is often a fixed and finite amount of time with which to run whatever algorithm is chosen. A limit on running time removes the time component from the comparisons and decides that the "best" algorithm is the one that returns the highest-valued schedule within the time limit.

This fact implies that what are really needed are algorithms that build the best schedule possible within an allotted amount of time. These are known as "contract algorithms," which are a subset of the more general "anytime" algorithms. The present invention is a contract algorithm that combines two different approaches for mission scheduling to build a high-quality solution to a mission scheduling scenario.

For clarity, details of the present invention will be described in sections, as follows. First, a description of mission scheduling and an exemplary problem statement are provided. Second, contract algorithms are described. Third, time-budgeting is introduced. Fourth, the concept of Mission Scheduling using time-budgets and the algorithms of the present invention are described. Fifth, exemplary experimental results are provided.

(4.1) Mission Scheduling and Problem Statement

The Mission Scheduling (MS) problem described below is defined to fit the specific needs and constraints of real world sensor management applications. As can be appreciated by one skilled in the art, the present invention is not limited thereto and can be applied to a variety of MS problems. As such, there are various constraints that can be added or altered to fundamentally change the problem. Different applications may also require a different objective function. Nevertheless, the problem statement is meant to conform to realistic systems where a heterogeneous set of resources can be scheduled in discrete intervals and the value of a schedule is measured in the number and priority of successfully scheduled missions.

The mission scheduling problem entails completing a set of missions by fitting the various tasks that make up a mission into the discrete schedules of multiple resources. A problem instance includes temporal and resource-usage constraints. The following definitions are necessary for stating the problem.

A Mission Scheduling scenario can be described as a tuple $(M,T,\Sigma,d,T,S,R,B,E,D)$ where:

1. M is a finite set of missions;
2. T is a finite set of tasks;
3. $\Sigma$ is a finite set of resources (e.g., sensors);
4. $Z^+$ is a set of all positive integers;
5. $Z^*$ is a set of all non-negative integers;
6. $d \in Z^+$ is the duration of the resource schedules, where d corresponds to the number of discrete timeslots for which each resource is available;
7. $T:M \rightarrow \{T\}$ is a mapping of missions to sets of tasks, signifying that every mission is made up of one or more tasks,
8. $S:T \rightarrow \{\Sigma\}$ is a mapping of tasks to sets of resources, signifying that each task can be accomplished by one or more resources;
9. $R:M \rightarrow R^+$ is a function that gives the real, positive reward value earned if a mission is successfully scheduled;
10. $B:T \rightarrow Z^*$ is a function that gives the index of the first timeslot in which a task can be scheduled;
11. $E:T \rightarrow Z^*$ is a function that gives the index of the last timeslot in which a task can be scheduled; and
12. $D:T \rightarrow Z^+$ is a function that gives the duration of a task, i.e. the number of consecutive timeslots the task will fill in the schedule.

The preceding definitions are subject to the following limitations:

1. $\forall m \in M$, $|T(m)|>0$, i.e., missions contain at least one task;
2. $\forall m_1, m_2 \in M$, $T(m_1) \cap T(m_2) = \emptyset$, i.e., each task is part of only a single mission;
3. $\forall t \in T$, $|S(t)|>0$, i.e., a task can be scheduled to at least one resource; and
4. $\forall t \in T$, $E(t)<d \& E(t)-B(t)+1 \geq D(t)$, i.e., the time window in which a task can be scheduled must fit into the schedule and be long enough to fit the task itself.

As used herein, $\forall$ denotes "for all," m denotes an individual mission, and | | denotes magnitude. Additionally, $\in$ denotes "element of," $\cap$ denotes an intersection between two sets, $\emptyset$ denotes an empty set, and t denotes a single task.

The above limitations provide a problem with a set of missions, where each mission is made up of one or more tasks. Each task can be scheduled on one of a set of resources for some duration and within some time window. If all of the tasks that make up a mission are scheduled, then the mission itself is considered scheduled and a reward is earned.

The process of filling the schedule can be seen as constructing a mapping of resource/timeslot pairs (representing the first timeslot a task is scheduled in) to tasks.

Definition. A schedule for a mission scheduling scenario MS=(M, T, X, $\Sigma$, T, S, R, B, E, D) is a mapping Sched: $\Sigma \times Z^* \rightarrow \{T, nil\}$, subject to the following constraints: $\forall s, s' \in \Sigma$, $0 \leq i, i' \leq d$, where s and s' are two individual resources and i and i' are points in time on the schedule having values between 0 and d.

If $\exists t \in T$ such that Sched(s, i)=t and Sched(s', i') t, then s=s' and i=i', i.e., each task is scheduled at most once;

If $\exists t \in T$ such that Sched(s, i)=t, then $s \in S(t)$, i.e., a task can only be scheduled on a valid resource;

If $\exists t \in T$ such that Sched(s, i)=t, then $B(t) \leq i \leq E(t)-D(t)+1$, i.e., a task can only be scheduled in a valid interval; and If $\exists t \in T$ such that Sched(s, i)=t, then Sched(s, j)=nil for $i<j \leq i+D(t)$, i.e., after a task is scheduled to begin, no other task can be scheduled on that resource for the number of timeslots in the scheduled task's duration.

In the above constraints, $\exists$ denotes "there exits," while j denotes an integer.

The goal of mission scheduling is to find a schedule that maximizes the combined reward of successfully scheduled missions. The set of scheduled missions for a schedule Sched, is $$\text{Succ} = \{m \in M | \exists s, i \text{ such that Sched}(s, i)=t, \forall t \in T(m)\} \quad (1)$$

i.e., the set of missions for which all corresponding tasks are successfully scheduled.

The objective function to be maximized is thus $$E(MS, Sched) = \sum_{m \in Succ} R(m). \quad (2)$$

(4.2) Contract Algorithms

An "anytime" algorithm is one that can run for "any" amount of time and then return some result. Such algorithms were described by Dean et al., and Zilberstein. Dean et al. is an article authored by T. Dean and M. Boddy, entitled, "An analysis of time-dependant planning," in *Proceedings of the Seventh National Conference on Artificial Intelligence*, pp. 49-54, Minneapolis, Minn., 1988. Zilberstein is an article authored by S. Zilberstein, entitled, "Using Anytime Algorithms in Intelligent Systems," in *AI Magazine*, 17(3), pp. 73-83, 1996.

It is assumed that the longer the amount of time that the algorithm runs, the better the returned result. A "contract" algorithm is a specific type of an "anytime" algorithm, where the amount of time it will be allowed to run is specified ahead of time. Another type of an "anytime" algorithm is an interruptible algorithm, that is, one that can be stopped at any time during its execution and will return a valid result.

Russell et al. describes a clear distinction between contract and interruptible algorithms. Russell et al. is a publication authored by S. J. Russell and S. Zilberstein, entitled, "Composing Real-Time Systems," in *Proceedings of the Twelfth International Joint Conference on Artificial Intelligence*, pp. 212-217, Sydney, Australia, 1991. In Russell et al., the authors explained that a contract algorithm is typically easier to construct because it is run with the knowledge of when it must return a result, while an interruptible algorithm is typically more useful because it is ready to return a result at any time. Russell et al.'s treatment of contract algorithms was using them as subroutines for constructing interruptible anytime algorithms.

It should be noted that algorithms can be both contract and interruptible. However, depending on the designer's objectives, the algorithms typically work best as one or the other. Since a contract algorithm knows how long it has to run, it can structure its development of the solution to take the run-time into account. This extra information implies that a contract algorithm should return a better solution than a plain interruptible algorithm run for the same amount of time. Although, this also means that if an (interruptible) contract algorithm is not allowed to run out its contract, its solution may be significantly worse than the plain interruptible algorithm. As applied to the Mission Scheduling problem, a contract algorithm can hold off on trying to schedule some low-value missions until the end, whereas an interruptible algorithm may want to try to schedule those missions right away for fear of being interrupted.

The algorithm described here, as is often the case with contract algorithms, is made up of multiple components that are themselves contract algorithms. This makes sense since there are a fixed number of tasks to; schedule. In other words, it should only take a fixed number of function calls to try to schedule the tasks. In order for the algorithm to meet its contract, it must have control over the runtime of those function calls. It is therefore up to the top-level algorithm to determine how best to divide up its allotted time among its internal components. This meta-resource allocation problem is referred to as time-budgeting.

(4.3) Time-Budgeting

Time-budgeting is a process by which time is allocated to various portions of an algorithm. Prior art exists for finding optimal methods of allocating time to the internal components of general contract algorithms. Such work was described by S. Zilberstein in a publication entitled, "Optimizing Decision Quality with Contract Algorithms," in *Proceedings of the Fourteenth International Joint Conference on Artificial Intelligence*, pp. 1576-82, Montreal, Canada, 1995.

Several problems arise when trying to apply the methods of the prior art to the Mission Scheduling problem. First of all, the methods of the prior art rely on constructing performance profiles, which relate the allotted contract time to the quality of the resulting solution. These performance profiles are heavily dependant upon the system the algorithm is run on and the characteristics of the particular problem it is being asked to solve. It is also difficult to evaluate the quality of a solution to Mission Scheduling because it is computationally infeasible to find the optimal solution. Finally, the algorithm of the present invention is working with a time limit, and any time spent deciding how to budget its time is not spent finding a better schedule. Since it is unclear whether or not a provably optimal component-time-allocation will result in better schedules, the present invention utilizes another approach.

Decisions about time allocation are based on intuition about the structure of the problem and observations that reveal an efficient use of allocated time. By designing the algorithm to construct a solution incrementally, the possible benefit of single iterations can be evaluated. Thus, time can be budgeted based on that benefit as well as the expected difficulty in achieving it. As described below, the algorithm of the present invention is made up of two MS techniques. The potential benefit of these two techniques requires slightly different budget allocation methods. For clarity, the budgeting methods will be described in further detail below after the MS techniques have been described.

(4.4) Time-Budget Scheduling and Algorithms of the Present Invention (4.4.1) Intuition The algorithm of the present invention provides a fast method of building good mission schedules. Recognizing that finding a provably optimal schedule is computationally infeasible on large problems, the present invention focuses on local search techniques that iteratively build a schedule with no guarantee of optimal convergence. Although the present invention does not require provable convergence, it is necessary that the algorithm return better solutions the longer it is allowed to run.

The scheduling techniques employed by the present invention are inspired by the observation that, given a partial schedule and some remaining missions to schedule, some missions and tasks will be easier to fit into the schedule and some will be harder. An "easy" task is one that can be inserted into the schedule by simply moving around some of the tasks currently in the schedule. A "hard" task is one that requires more complex, unintuitive changes to the schedule in order to fit it. An example of a complex change: to the schedule would be to remove some set of tasks in order to fit in some other set of tasks. This can be particularly unintuitive because removing a single task can cause an entire mission to become "unsuccessful" (i.e., all of the mission's tasks are not scheduled), thus any of the mission's tasks that remain in the schedule are making no value contribution. Recognizing when this is beneficial can be difficult.

Intuition and experience indicates that a technique good for scheduling the "easy" tasks will not be particularly good at the "hard" tasks, and vice versa. By having techniques that can focus on a particular type of task, techniques can be developed to surpass the performance of a general method that tries to be good at both.

Many tasks, especially early in the scheduling process, will be easy to schedule. What is desirable at early stages is a method that is aware of the schedule structure and can focus on fitting a single given task. To fulfill such a need, the present invention includes Systematic Swapping (SS). SS is a method of shifting and swapping tasks to free up adequate space to fit a given task. As the schedule fills, it will get harder to add new tasks. As it becomes increasingly difficult to add new tasks to the schedule, it desirable to be able to move and remove tasks in order to make bigger changes to the schedule and thus allow many new tasks to be inserted. For this purpose, Simulated Annealing is used to randomly perturb the schedule out of local maximums.

(4.4.2) Top-Level Algorithm

Figure 3:
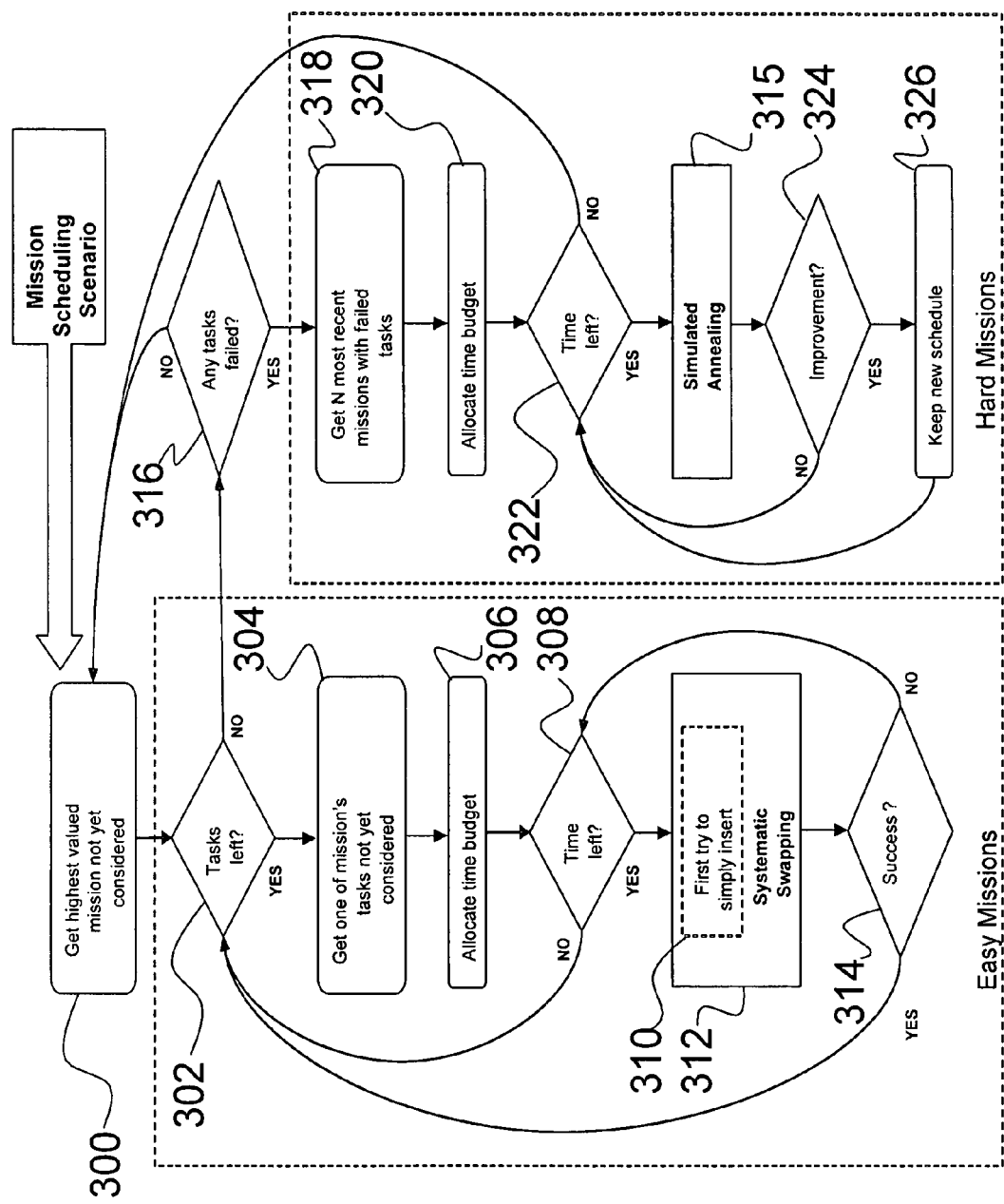
FIG. 3 is a flow chart illustrating a process for multi-mission scheduling.

As shown in FIG. 3, the present invention works by incrementally building a valid schedule by adding missions to the schedule, one-at-a-time, starting with the highest-valued missions 300. As can be appreciated by one skilled in the art, depending upon convention, the system can start with the least-valued mission instead of the highest-valued mission, and any variation therebetween.

To successfully schedule a mission, all of its tasks must be scheduled. Initially, the present invention identifies whether or not the mission with the largest mission value has any tasks left 302 to be scheduled. Then, the system retrieves the task not yet considered 304 and allocates a time-budget 306 for scheduling the task. If there is time left 308, the system attempts to insert 310 unscheduled tasks into the schedule without moving any previously scheduled tasks. If a task won't immediately fit into the schedule, the present invention then proceeds with Systematic Swapping 312 (described in further detail below) in order to move around previously scheduled tasks to make room for the new one. If the Systematic Swapping 312 procedure is a success 314 and results in the task being scheduled, then the system identifies if the mission has any tasks left 302 to be scheduled. Alternatively, if the Systematic Swapping 312 procedure is not a success 314, then the system identifies if there is time left 308 in the time-budget in order to continue performing the aforementioned procedure.

If some of the mission's tasks were unable to be scheduled by Systematic Swapping 304, the task is considered a failed task, meaning that it failed to be scheduled through the Systematic Swapping 304 and/or other scheduling procedures. In this case, a Simulated Annealing 315 routine is then used (also described in detail below) to try and improve the schedule by adding some of unscheduled tasks from the current mission and other missions that failed to be scheduled. It should be noted that because each mission has a mission value, the schedule also includes a collective value. At some point before performing the Simulated Annealing 315 procedure, a value of the current schedule is generated.

If the mission includes any tasks that failed 316, then the system identifies and retrieves the N most recent missions with failed tasks 318. The failed tasks are added to a list of unscheduled tasks. A time-budget is then allocated 320 to determine how much time can be spent to allocate resources to a particular task.

If there is a sufficient amount of time left 322, then the Simulated Annealing 315 procedure is performed to allocate resources to the tasks and generate a new schedule. If the new schedule is an improvement 324 over the previous schedule, then the system keeps the new schedule 326. Alternatively, if the new schedule is not an improvement 324, then the system determines if there is a sufficient amount of time left 322 to continue performing iterations of the Simulated Annealing 315 procedure.

As can be appreciated by one skilled in the art, the terms Systematic Swapping and Systematic Annealing are used for illustrative purposes only and the present invention is not intended to be limited thereto.

An example of the top-level algorithm 400 is given in detail in FIG. 4. Additionally, various criteria 402 such as variables, functions, and input parameters for the top-level algorithm 400 are also provided.

In order to keep within a time goal, a user must budget the time that can be spent by any particular call to the Systematic Swapping and Simulated Annealing routines. Determining these budgets requires two computations: (1) how much time is available for the rest of the calls to these functions over the lifetime of the process; and (2) what portion of the remaining time will be budgeted.

To compute the time available, it must first be understood that the time it takes to insert a task into the schedule if there are no conflicts is very small compared to the other operations performed by the present invention. This ease with which the present invention schedules a mission implies that it is worth attempting to try to insert every task regardless of how low the corresponding mission value is. Additionally, it would be undesirable to run out of time before each task has had been attempted to be scheduled. Therefore, the time available is defined as the amount of time remaining less an estimate of the amount of time required to simply insert (if no conflicts exist) each of the remaining tasks. To get such an estimate, records are kept (throughout the duration of the algorithm) for the amount of time required each time a task is directly inserted into the schedule (i.e., insert time). The insert time is fairly stable, though in some circumstances it may be significantly higher or lower than the mean. The estimate for insert time is then the mode of the time required by all previous inserts.

After determining the amount of available time, the portion (task-specific time-budget) of it that is to be allocated to a specific function call is then determined. A purpose of the Systematic Swapping function is to fit a single task into the schedule. Therefore, the budget is determined based on the value of the mission the task belongs to, the value of all remaining: missions, and the total number of tasks remaining:

$$\text{portion} = \max\left\{\frac{\text{mission value}}{\sum \text{remaining mission values}}, \frac{1}{\text{\# remaining } tsks}\right\} \quad (3)$$

The maximum is taken from two ratios: the portion of the remaining value being scheduled, and the portion of the remaining tasks being scheduled. Since the missions with the highest priorities are considered first, the second ratio will only be used when there is a single mission remaining. The brackets with a comma between the two ratios indicates that the maximum ratio of the two is chosen.

When the Simulated Annealing (SA) function is called, it is meant to improve the schedule with the addition of multiple tasks from multiple missions. As described below, the SA method does not have to schedule all of the missions passed to it to be a success. Although the SA function attempts to schedule multiple missions, all but one of those have been attempted before. Therefore, it is desirable to keep the budget comparable to the time allocated by the SS method to scheduling a single task. The budget portion is therefore based on the mean value of the input missions, as shown below:

$$\text{portion} = \max\left\{\frac{\text{mean(failed } mssn \text{ } vals)}{\sum \text{remaining } mssn \text{ } vals} * \frac{\text{\# failed } mssns}{N}, \frac{\text{\# failed } tsks}{\text{\# failed } tsks + \text{\# remaining } tsks}\right\}. \quad (4)$$

As used in equation 4, the * denotes multiplication, mssn denotes mission, and the comma denotes a separator between two ratios.

Figure 5:
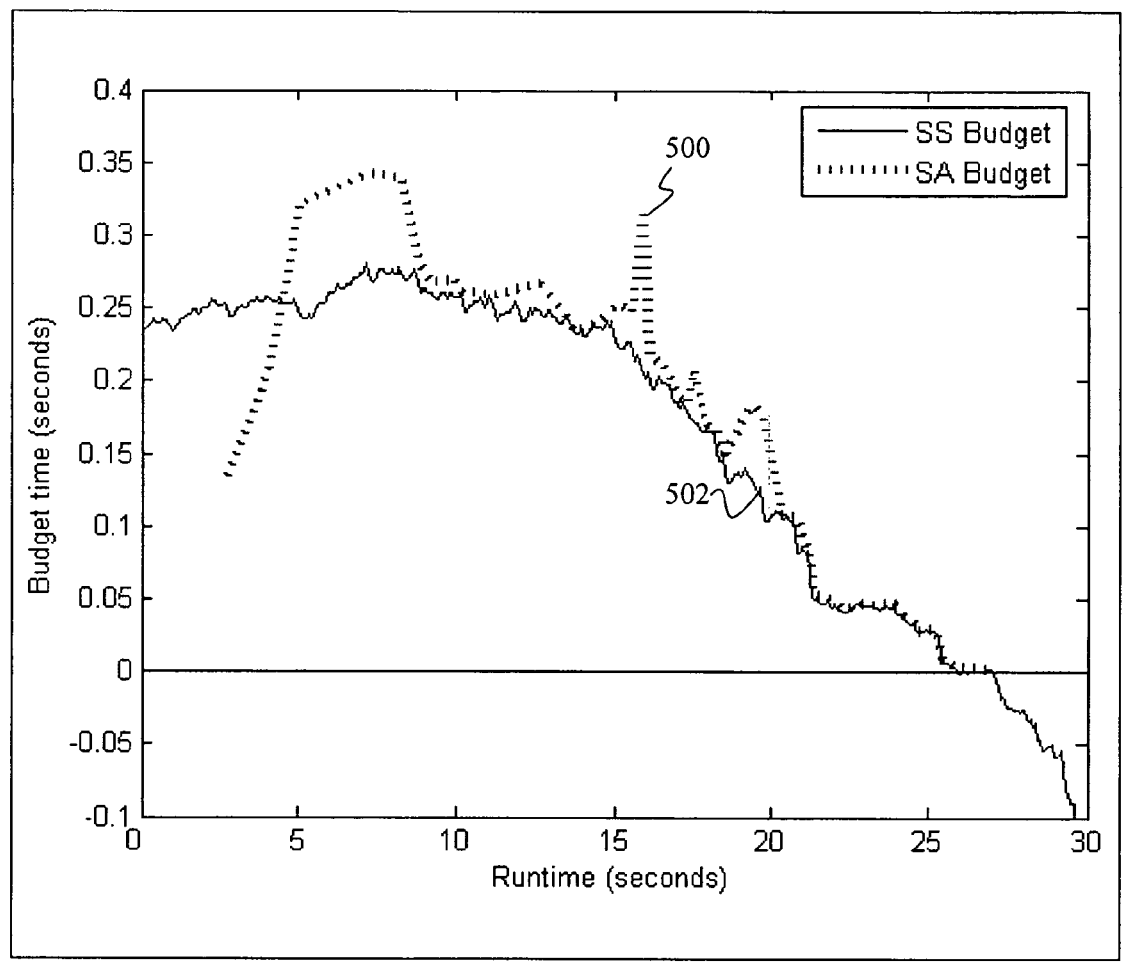
FIG. 5 is a graph illustrating exemplary time-budget progressions for the Systematic Swapping and Simulated Annealing algorithm with a total goal of thirty seconds to schedule 200 missions on four resources.

FIG. 5 illustrates a graph of the progression of the SA budget 500 function and the SS budget 502 function for a sample run of the algorithm. For illustrative purposes, the algorithm was run on an instance of Mission Scheduling with 200 missions and four resources. Although the algorithm was given a time goal of thirty seconds, in actuality, it took 29.8 seconds to complete. Toward the end of the process, both budgets drop below zero. This indicates that there is only enough time remaining to try to simply insert all of the remaining tasks. Therefore, neither Systematic Swapping nor Simulated Annealing will run.

(4.4.3) Systematic Swapping

Figure 6:
FIG. 6 is a pseudo-code listing of an exemplary Systematic Swapping algorithm that tries to schedule a task by moving around currently schedule tasks.

FIG. 6 illustrates an exemplary Systematic Swapping subroutine algorithm 600 that attempts to schedule a task by moving around (without removing) currently scheduled tasks. For clarity, various criteria 602, such as variables, functions, and input parameters for the Systematic Swapping subroutine algorithm 600 are also provided. The purpose of the Systematic Swapping algorithm 600 is to fit a single task into the schedule, within the allotted time, without removing any previously scheduled task. The un-scheduling of tasks is avoided because doing so would invariably cause a scheduled mission to become unscheduled. Since the missions are ordered based on their reward value, any previously scheduled missions must have a higher reward than the current one. Therefore, un-scheduling one mission so as to schedule the current one will always results in a worse schedule. It may be the case that removing a higher-valued mission allows a user to schedule multiple lower-valued missions with a greater combined value than the other, but Systematic Swapping is limited to a local view of the schedule that only includes the previously scheduled tasks and the single current task. Therefore, it cannot recognize such situations. Those tradeoffs will be addressed in the Simulated Annealing part of the algorithm.

The basic idea behind Systematic Swapping is that the SS algorithm 600 initially tries to fit the task (into the schedule) without changing the schedule. If the SS algorithm 600 is unable to do this, then, as time permits, the present invention attempts to move previously scheduled tasks that are in the way of the current task in order to make room for it. The function works recursively, that is, when it tries to move a previously scheduled task it does so with the same Systematic Swapping procedure. The result of this is situations where it may be trying to move a task to make room for a task, to make room for a task, etc.

The algorithm selects which task to move according to the following procedure. The algorithm randomly chooses a single resource that the task can be scheduled to (one of S(t)), and a random interval within it's scheduling window (i.e., an interval of size D(t) within [B(t),E(t)]). The algorithm then randomly chooses a task from those that are currently scheduled at times that intersect with the chosen interval on the chosen resource. If the task is successfully moved, the algorithm then tries again to fit the original task into the schedule. If the original task still will not fit, the algorithm then continues to move tasks that conflict with the chosen resource/interval combination. This continues until the task is scheduled, a conflicting task cannot be moved, or the algorithm runs out of time. If a conflicting task cannot be moved, then the algorithm chooses a new random resource/interval combination and starts again.

When moving a previously scheduled task with a recursive call to the Systematic Swapping procedure, the task must be actually moved out of the resource/interval combination that is being cleared. To do this, an AvoidList is passed to the algorithm that specifies intervals in which tasks cannot be inserted. After several recursions (e.g., when moving a task to make room for a task to make room for a task, etc.), the AvoidList will contain an interval for every recursion and the schedule will thus have multiple intervals into which the task to move cannot be moved.

To keep the Systematic Swapping procedure within the given time-budget, care must be taken to divide the allotted time between the recursive calls. Often, more than one task must be moved in order to fit the new task. Thus, it is not desirable to spend the entire time-budget moving a single task. Therefore, a "ramping up" procedure is employed that initially budgets very little time to deeper recursive calls. It should be noted that the deeper the recursive call the less likely a successful move will help to accomplish the goal of fitting the original task. Therefore, an arbitrary limit of recursive calls is utilized. As a non-limiting example, three recursive calls are utilized, resulting in the following procedure for determining the time-budget for each of the three calls. Initially, all recursive calls have a zero-second budget. This means that the first time a recursive call is made the algorithm will try to simply move the task without making any further calls to move other tasks that are in its way. However, every time the algorithm returns to trying to insert the original task, it increases the time-budget for further first and second recursions. The budget to the third recursion is never increased, because it is never allocated the time to make another recursion. Furthermore, the rate at which the recursive budgets increase is slower for the deeper recursion. This is consistent with the knowledge that deeper recursions have less impact and should therefore have less time spent on them.

In implementations of the present invention (although not limited thereto), the budgets are typically grown at a polynomial rate with the first recursion's budget growing five times as fast as the second's. FIG. 7 illustrates the progress of these budgets for a single call to Systematic Swapping. In the plot, "level 2" 700 refers to the first recursion, and "level 3" 702 refers to the second recursion. The data was taken from a call to the Systematic Swapping subroutine with a budget of 1.18 seconds. This particular call was chosen because it was ultimately unsuccessful at scheduling the task and thus completely exhausted its budget. As shown in FIG. 7, both budgets grow polynomially, with the level 2 budget 700 growing about five-times faster than the level 3 budget 702. On the ninth iteration 704, the level 2 budget 700 begins to decline. This is because the time remaining in the 1.18 second level 1 budget has dropped below the level 2 budget 700 curve. The algorithm then adjusts it method for determining the level 2 budget 700 to merely assigning most of the remaining time. The same reversal happens to the level 3 budget 702 on the eleventh iteration 706. Finally, one may notice that the total time-budgeted to the level 2 calls throughout the run, 2.78 seconds, is more than the total top-level budget. This is because each level 2 call did not use its entire budget. Typically, before starting another iteration, the algorithm would recognize that it would not be able to complete the iteration within the budgeted time and would therefore quit early.

(4.4.4) Simulated Annealing

As mentioned earlier, one limitation of the Systematic Swapping algorithm is that it cannot recognize situations where it may be beneficial to remove a previously scheduled task/mission from the schedule. This algorithmic limitation translates into an upper bound on the achievable schedule quality. In order to loosen (though not entirely eliminate) this bound and address the stated limitation of Systematic Swapping, Simulated Annealing (SA) is presented herein.

FIG. 8 illustrates an exemplary Simulated Annealing (SA) algorithm 800 that tries to improve the schedule by introducing multiple tasks at once. For clarity, various criteria 802 such as variables, functions, and input parameters for the SA algorithm 800 are also provided. Simulated Annealing is a local search method for optimization where a suboptimal solution is randomly perturbed in each iteration. The resulting new solution is then evaluated. If the new solution is better than the previous solution, then it is accepted. If the new solution is worse than the previous solution, then it is accepted with some probability, otherwise the solution reverts to the previous one. As the SA algorithm 800 progresses, that probability decreases, such that by the end of the SA algorithm 800 only improvements are accepted. By accepting a worse solution, the SA algorithm 800 avoids local optima in its search for the global optimum.

The fact that Simulated Annealing will temporarily accept a worse solution is exactly what allows it to avoid the mentioned limitation of Systematic Swapping. However, Simulated Annealing has its own limitations. For example, the Simulated Annealing process cannot easily recognize when minor adjustments to the schedule will make a task schedulable. Systematic Swapping is a focused technique for quickly identifying these minor adjustments, while the lack of focus in Simulated Annealing's random perturbations is what makes it better at more complicated adjustments.

A naïve implementation of Simulated Annealing for Mission Scheduling may be as simple as randomly placing tasks in, or removing tasks from, the schedule (in each iteration). The quality of the schedule would then be the value of missions for which every task is scheduled in a valid location. However, in a problem of any reasonable size, only a small portion of the locations in which a task may be placed would be valid. This means that many iterations would be required in order to have a reasonable chance at tasks getting randomly placed in a valid location.

As discussed above, Simulated Annealing is not used for placing relatively-easily-scheduled tasks (as is done well by Systematic Swapping). Instead, Simulated Annealing is only applied where the other algorithm fails (i.e., when the schedule can be improved by first removing some previously scheduled tasks). This will require an implementation of Simulated Annealing that takes the partially-filled schedule and tries to improve it with the addition of multiple unscheduled missions.

As shown in the top-level algorithm illustrated in FIG. 4, TimeBudgetScheduling, maintains a list of missions for which an unsuccessful attempt has been made to schedule the mission. Any time Systematic Swapping is unable to schedule all of a mission's tasks (and time permits), an attempt is made to improve the schedule by running Simulated Annealing with the most recently failed missions. In such a case, Simulated Annealing is being called to "improve the schedule" instead of "schedule the failed missions" because, unlike Systematic Swapping, it is not just trying to add some missions to the schedule. An improved schedule may add all the failed missions while removing one or more previously scheduled missions, or it may find a way to insert one of the failed missions without removing anything. The Simulated Annealing algorithm returns a list of newly scheduled missions and a list of missions that have been removed from the schedule. After the call, the algorithm then updates its list of failed missions to reflect these changes.

A problem with the naïve implementation of Simulated Annealing (as mentioned above) is the large ratio of perturbations that either degrade or don't change the quality of the schedule to those that improve the schedule quality. The Simulated Annealing method described above is very flexible in the schedules it can explore, but its flexibility results in the need for many iterations. The trade-off between complexity and flexibility is inherent to the problem. The flexibility is what makes Simulated Annealing useful, but the flexibility needs to be limited to make the complexity reasonable. To limit the flexibility in the present invention, limitations are set for the number of tasks that can be perturbed and the number of ways those tasks can be perturbed.

On a call to the implementation of the present invention, a list of unscheduled tasks is passed as input. These are the unscheduled tasks of the failed missions that are being used to improve the schedule. The only tasks that are allowed to be perturbed (moved) are those in the input and any previously scheduled task that is currently at a location that intersects with the valid scheduling window of an input task. That is, only those tasks that are potentially blocking the input tasks from being scheduled can be moved. All other tasks in the schedule will stay at their current scheduled location throughout the run of Simulated Annealing. Second, for any task, limitations are set for the ways the task can be perturbed. For example, limitations as set for the locations the task can be moved to. The task can be moved to either locations (resource/timeslot pairs) where it can be validly scheduled, or it can be perturbed by un-scheduling it.

One exemplary iteration of the Simulated Annealing algorithm is as follows:
1. a task is chosen at random from those that are allowed to be perturbed (i.e., the perturbed list);
2. if it is currently scheduled, then it is moved to one of the available locations (chosen at random) where it can be validly scheduled, or it is removed from the schedule;
3. if it is not currently scheduled, then it is moved to one of the available locations (chosen at random) where it can be validly scheduled;
4. if the resulting schedule is an improvement, then keep it and go to the next iteration; and
5. if the resulting schedule is not an improvement, then keep it with some probability and go to the next iteration.

There are two issues that remain to be dealt with: (1) how to determine the "value" of a schedule; and (2) how to keep the running time within the budget.

In each iteration of the Simulated Annealing process, after the schedule is perturbed, the resulting schedule is evaluated to see if it is an improvement or not. One way to do this is to use the sum of the rewards of all the missions that are fully scheduled. A problem with using the sum of the rewards is that adding a task to the schedule will not increase the schedule's value unless it is the last task of its mission to be scheduled. It should be noted that a goal of the present invention is to maximize the sum of scheduled mission rewards, or to maximize the total mission value. Nevertheless, it is desirable to have the algorithm incrementally fill the schedule. Therefore, it is necessary to ascribe some value to adding any task, whether it completes the mission or not. An evaluation function is used that gives significant weight to scheduled mission rewards but still gives some value to individual missions. For example, the following function is used to calculate a value of the schedule.

$$V(\text{schedule}) = |schedTasks| + c \times \sum_{m \in schedMissions} R(m), \qquad (5)$$

where c is a constant value larger than the total number of tasks, |T|. With this evaluation function, a perturbation that adds a task to the schedule will always be accepted as an improvement.

Figure 9:
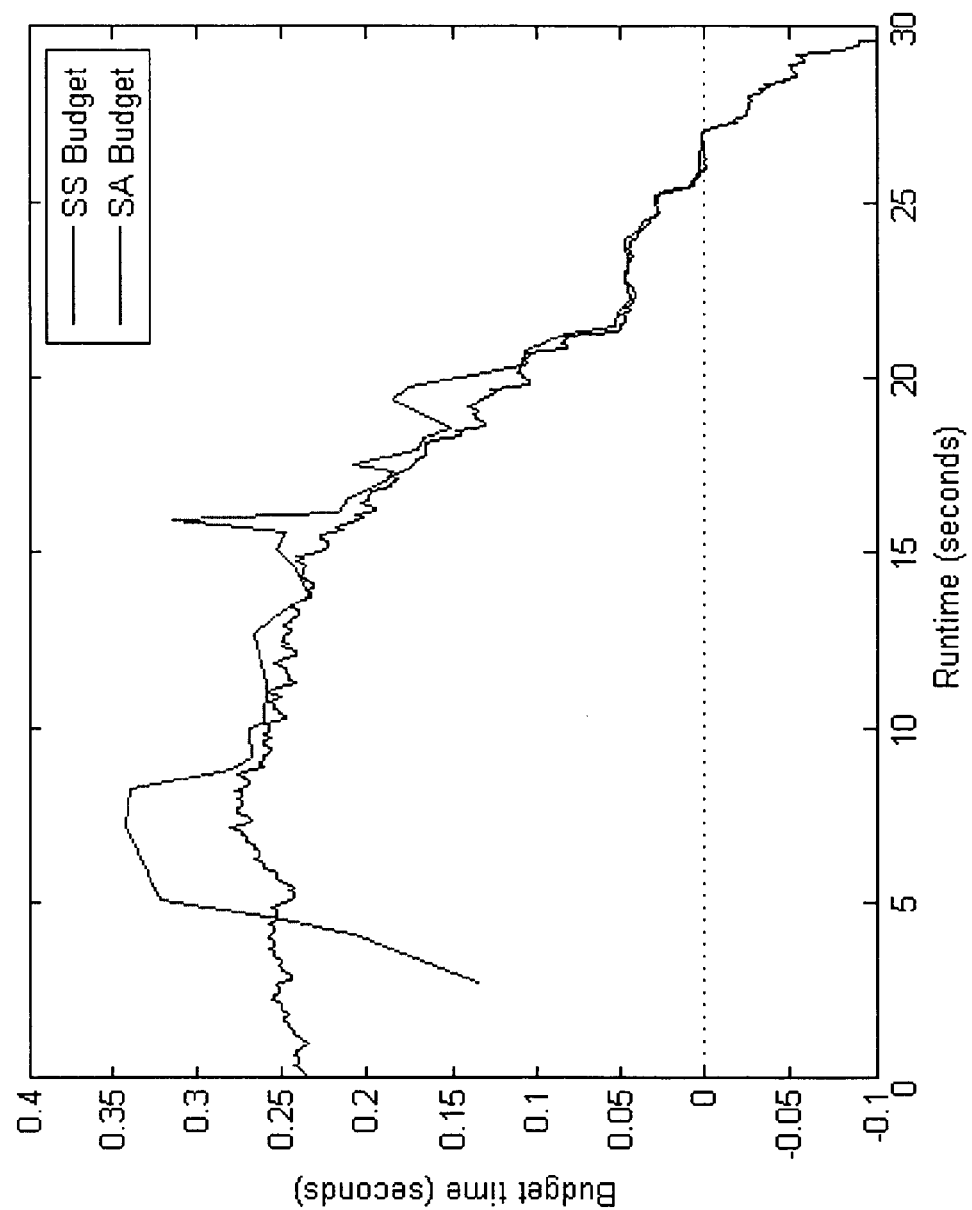
FIG. 9 is a graph illustrating the annealing schedule of an exemplary sample run of the Simulated Annealing algorithm.

The running time of Simulated Annealing can be strictly controlled by limiting the number of iterations. The number of iterations can be controlled by tracking the runtime of the algorithm and, at each iteration, estimating the time required by a typical iteration. The estimate can then be used to determine how many more iterations can be completed in the budgeted time. Naturally, as the algorithm progresses, the estimate will get more accurate and the allowed number of iterations will stabilize. One issue this raises is how to handle the transition probability, that is, the probability of accepting a new solution that is worse than the previous one. It is desirable to have the transition probability begin with a very high value (e.g., 0.99) and decay exponentially to a very small value (e.g., 0.0001) by the final iteration. With a fixed number of iterations, nIters, this can be accomplished by multiplying the probability value by a fixed delta after each iteration, where $$\text{delta} = p\text{final}^{1/nIters} \qquad (6)$$

and pfinal is the small final probability, such as 0.0001. Since there will not initially be an accurate estimate of the total number of iterations, a fixed delta cannot be set at the beginning of the algorithm. Instead, at the end of each iteration, when nIter is recomputed, delta is also recomputed. Although the rate of decay will change slightly throughout the run of the algorithm, it will nevertheless closely resemble an exponential decay of a fixed delta. FIG. 9 shows an example of the decay of the probability that an iteration of Simulated Annealing will accept a worse schedule. This exemplary call to Simulated Annealing ended up executing 349 iterations within its budget of 1.1 seconds.

(4.5) Experimental Results (4.5.1) Testing Scenario

As can be appreciated by one skilled in the art, the following experimental results are provided for illustrative purposes only and the present invention is not intended to be limited thereto. To evaluate the performance and quality of the algorithm of the present invention, a testing scenario was used that was motivated by real-life sensor networks with specific requirements. These networks require a 24-hour schedule with discrete timeslots of 100 milliseconds. The tasks that are to be scheduled on the sensors can range in duration from hundreds of milliseconds to several hours. A mission is made up of from one to three tasks, and each task can be scheduled on from one to three different sensors. Typical requirements range from scheduling 50 to 300 missions and 100 to 600 tasks.

Figure 10:
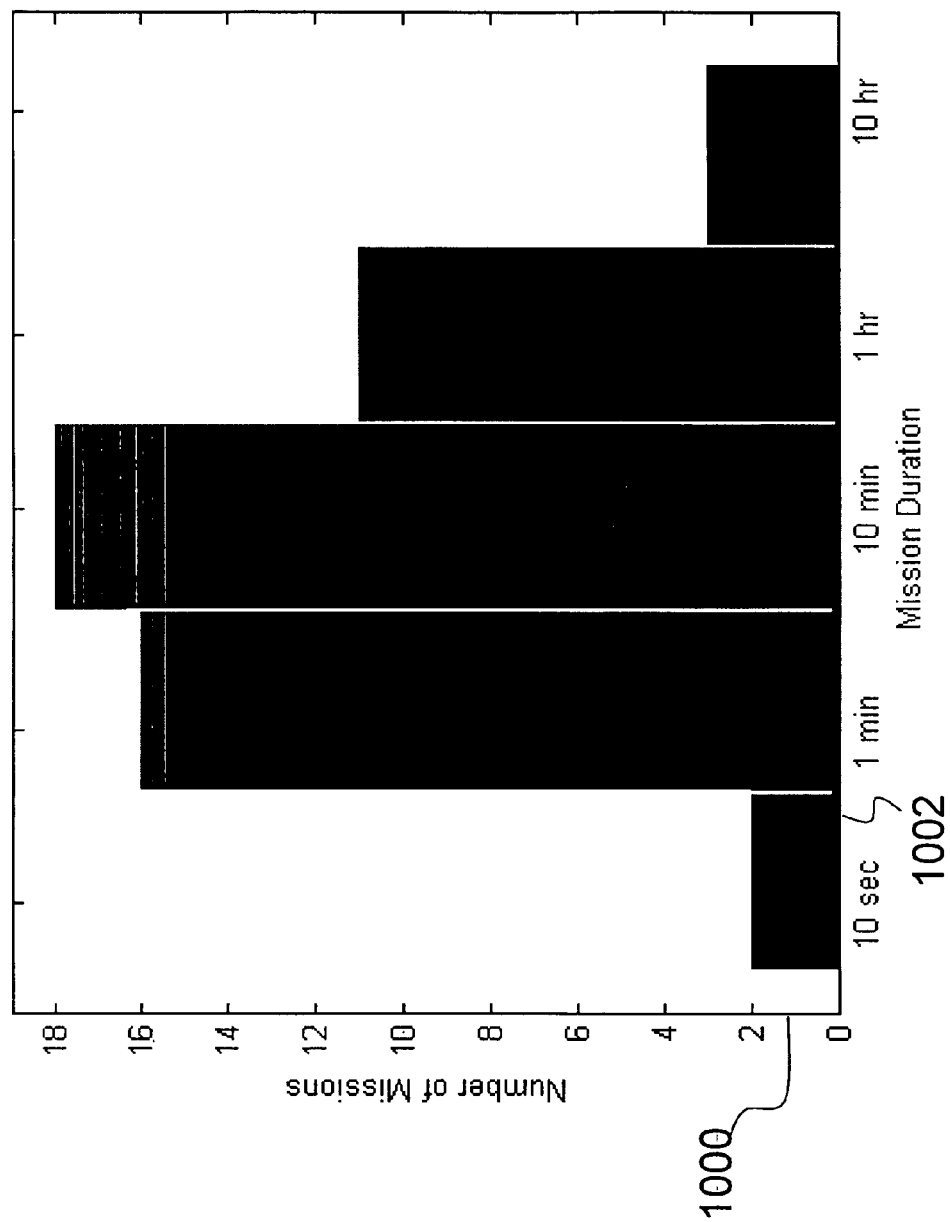
FIG. 10 is a graph illustrating the distribution of the orders of magnitude of the missions in an exemplary scenario.
Figure 11:
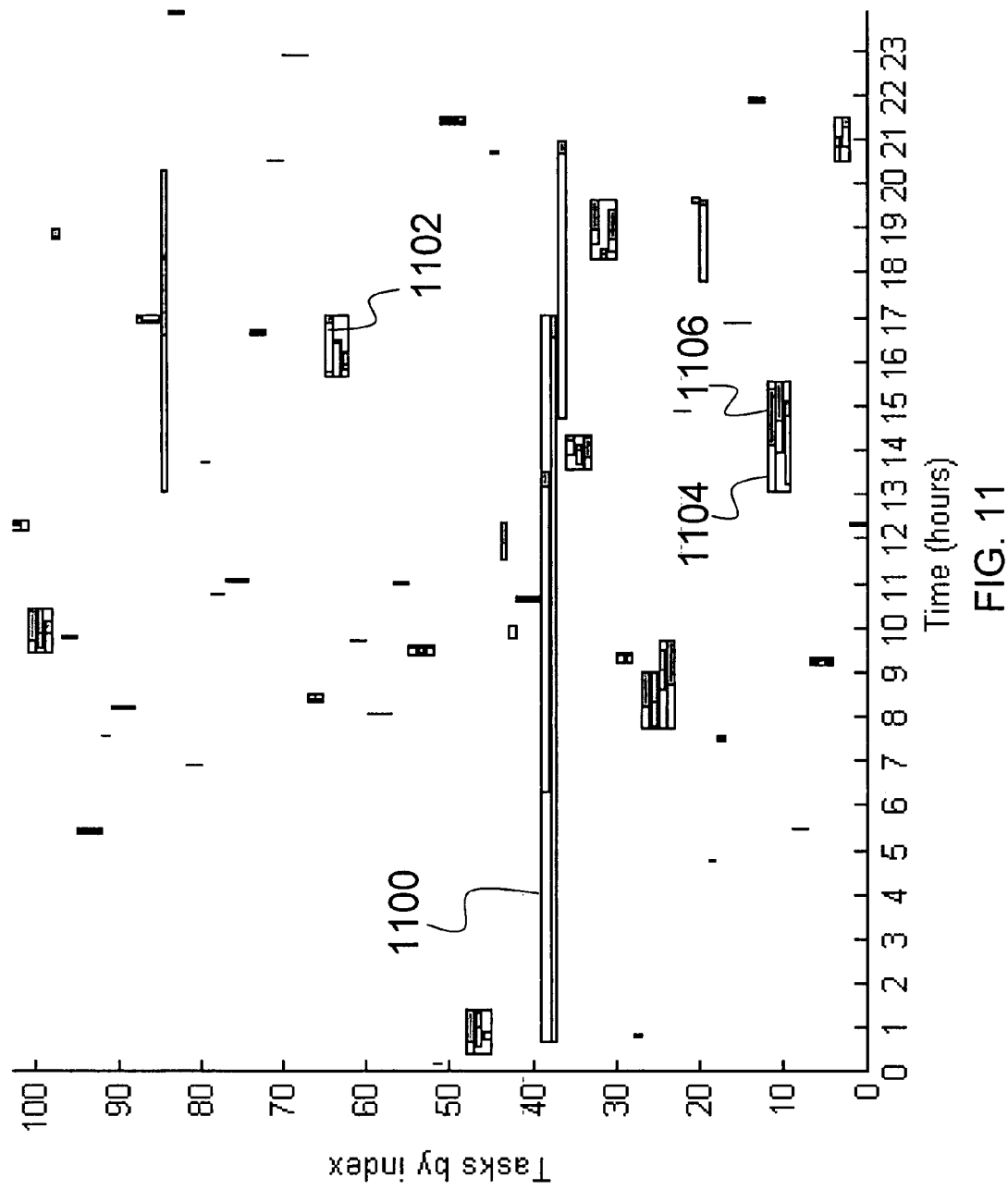
FIG. 11 is a graph illustrating an exemplary scenario of multi-mission scheduling.

Real-life missions come in many different types. For example, missions are made up of tasks that require seconds, minutes, or hours to complete. Typically, all the tasks of a single mission have durations of comparable magnitude. To simulate this in the testing scenarios, the order of magnitude of the mission's duration was first determined. The task durations were then randomly determined based on that magnitude. To simulate different "types" of missions, a mission's order of magnitude was drawn from a normal distribution centered on half the order of the entire schedule. FIG. 10 is a bar chart that shows the distribution of exemplary missions 1000 by order of magnitude of duration 1002. For the 24-hour schedule used, most missions take on the order of minutes to complete, though some take hours or seconds. As a non-limiting example, FIG. 11 demonstrates a typical testing scenario with fifty missions. Each outer box denotes a single mission 1100. Each inner box denotes a mission's tasks 1102. An un-shaded portion of an inner box denotes a task's duration 1104, while a shaded inner portion of an inner box denotes slack 1106 in the task 1102. As shown in FIG. 11, some missions 1100 take longer and require more tasks 1102 than others.

(4.5.2) Comparison with Greedy

The central motivation behind Time-budget Scheduling is the real-life need of an algorithm that runs in a predetermined amount of time. While an algorithm that runs "as fast as possible" will suffice in many situations, a lack of a time goal means the algorithm may run too long or may not take full advantage of the time that it has. An example of such an algorithm is a Greedy approach, which simply schedules missions, one-at-a-time, ordered by value. Once a mission is scheduled it cannot be moved or removed from the schedule. While this algorithm will not generate good schedules in hard scenarios, it will run very quickly. In fact, with a small enough time goal, the time-budget method of the present invention will produce the same schedule as the Greedy approach.

For illustrative purposes, the algorithm of the present invention is compared with the Greedy approach. The comparison is being made to provide the reader with a feel as to the benefits provided by extra running time. FIG. 12 illustrates a table showing an improvement of exemplary schedules provided by the present invention over those found by the Greedy algorithm, when given various time goals. As shown, the time goals are one 1200, two 1204, four 1206, and eight 1208 times the time required by the Greedy approach. The improvement is shown as a an increased percentage of efficiency.

(4.5.3) Comparisons with Singular Contract Methods

To demonstrate the quality of the present invention, the schedules it produces are compared to those produced by other algorithms that run for the same amount of time. In other words, the present invention is compared to other contract algorithms. Given the novelty of the stated MS problem, there are no existing contract or anytime algorithms that can be directly applied to solving it. Because there are no previous state of the art algorithms, benefits of the multi-algorithm method will instead be compared with singular-algorithm methods.

As described above, the algorithm of the present invention employs two, contract-based components to handle the scheduling of tasks and missions at various times in the scheduling process. For a comparison, each of these components has been developed into stand-alone contract algorithms for Mission Scheduling. Therefore, the present invention includes an algorithm that only uses Systematic Swapping to schedule missions, and another algorithm that only uses Simulated Annealing to schedule missions. While each of these techniques works well, the results show that combining the two, as also provided for by the present invention, consistently yields better schedules.

Figure 13A:
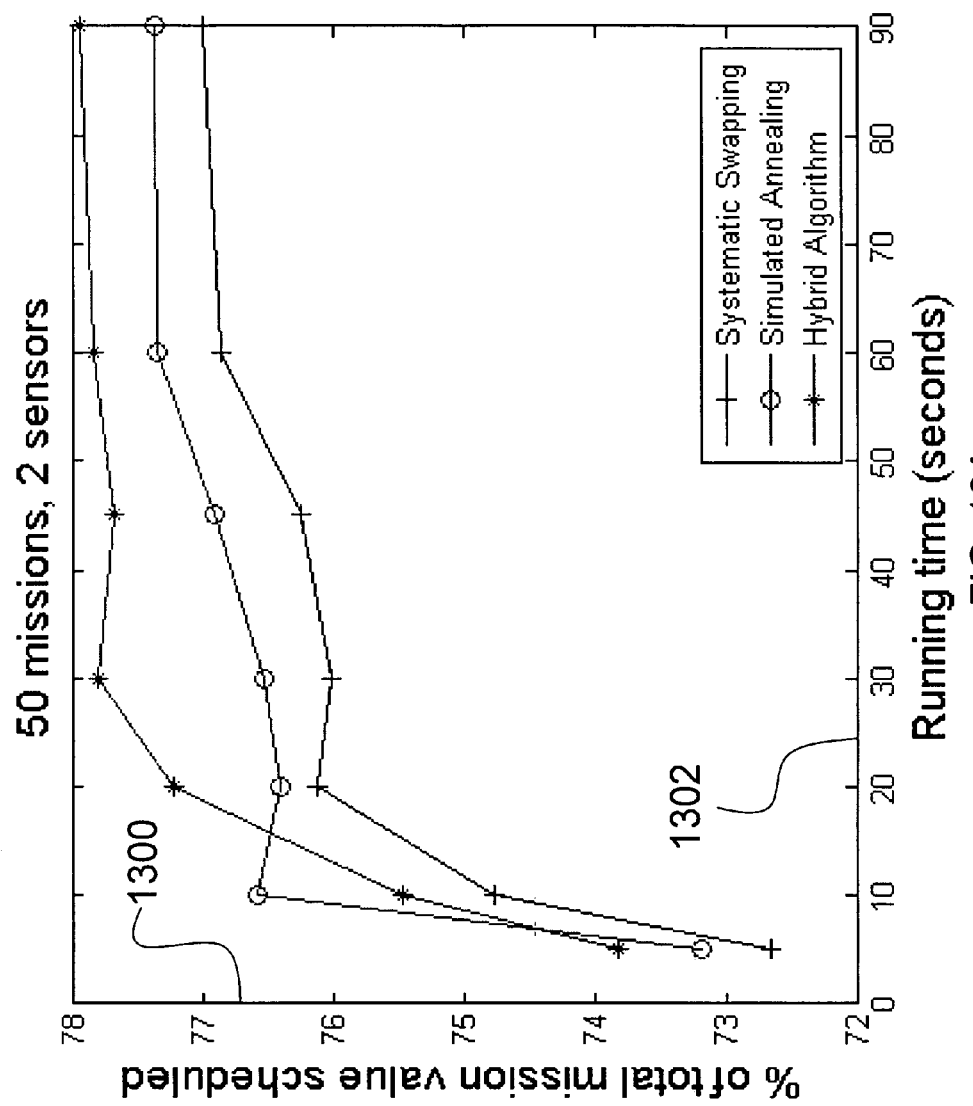
FIG. 13A is a graph illustrating exemplary comparisons in scheduling quality versus running time in fifty missions for the Systematic Swapping only algorithm, the Systematic Annealing algorithm, and the hybrid algorithm.
Figure 13B:
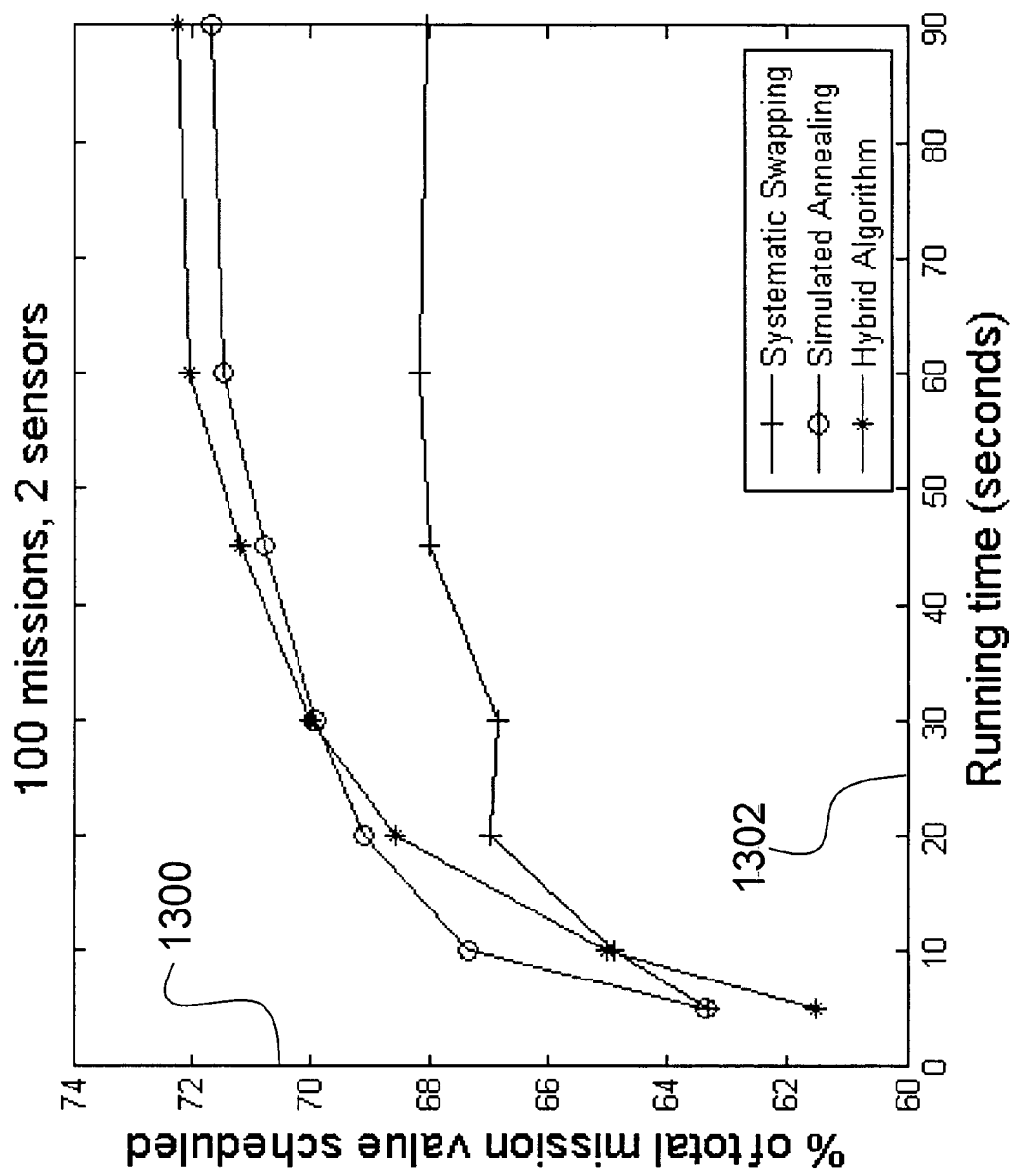
FIG. 13B is a graph illustrating exemplary comparisons in scheduling quality versus running time in 100 missions for the Systematic Swapping only algorithm, the Systematic Annealing algorithm, and the hybrid algorithm.
Figure 13C:
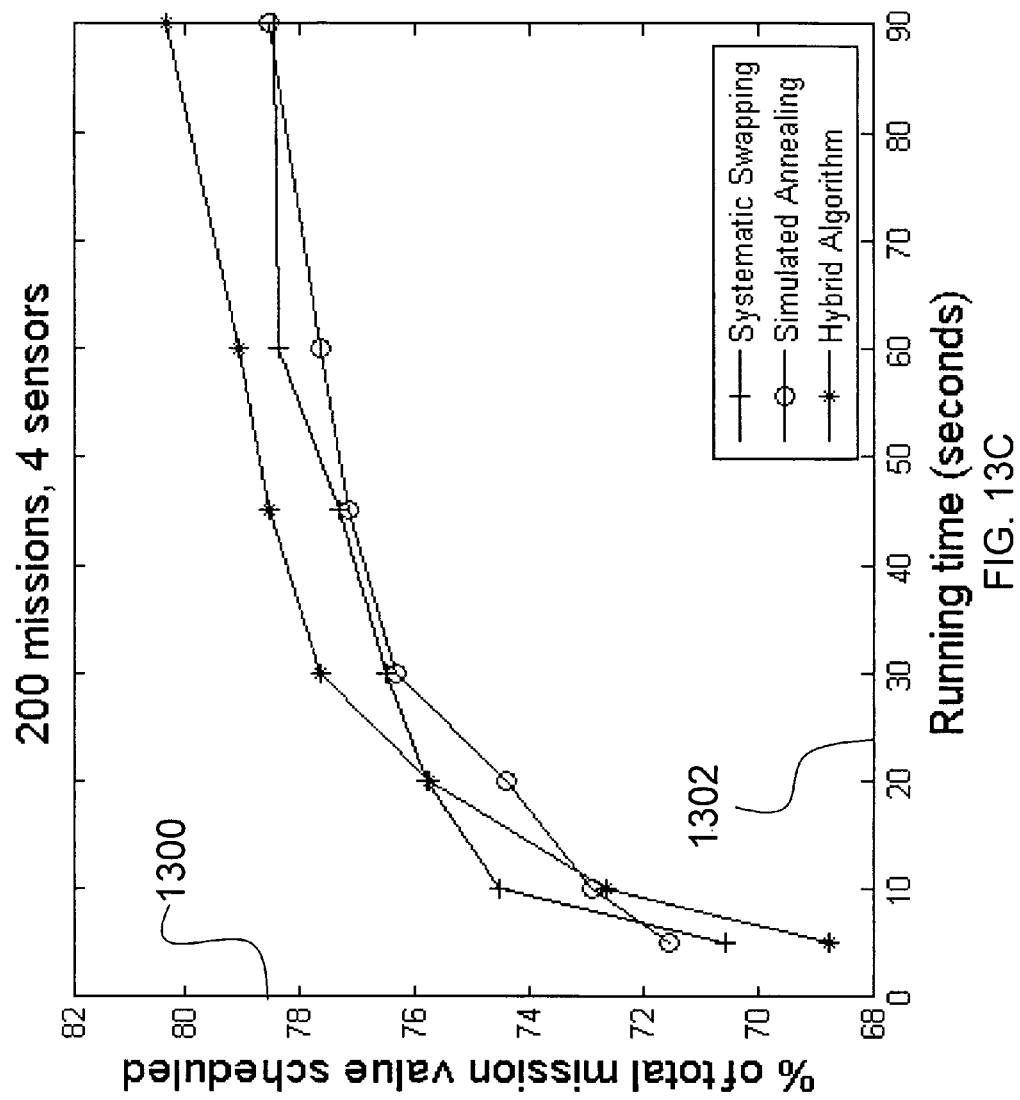
FIG. 13C is a graph illustrating exemplary comparisons in scheduling quality versus running time in 200 missions for the Systematic Swapping only algorithm, the Systematic Annealing algorithm, and the hybrid algorithm.
Figure 13D:
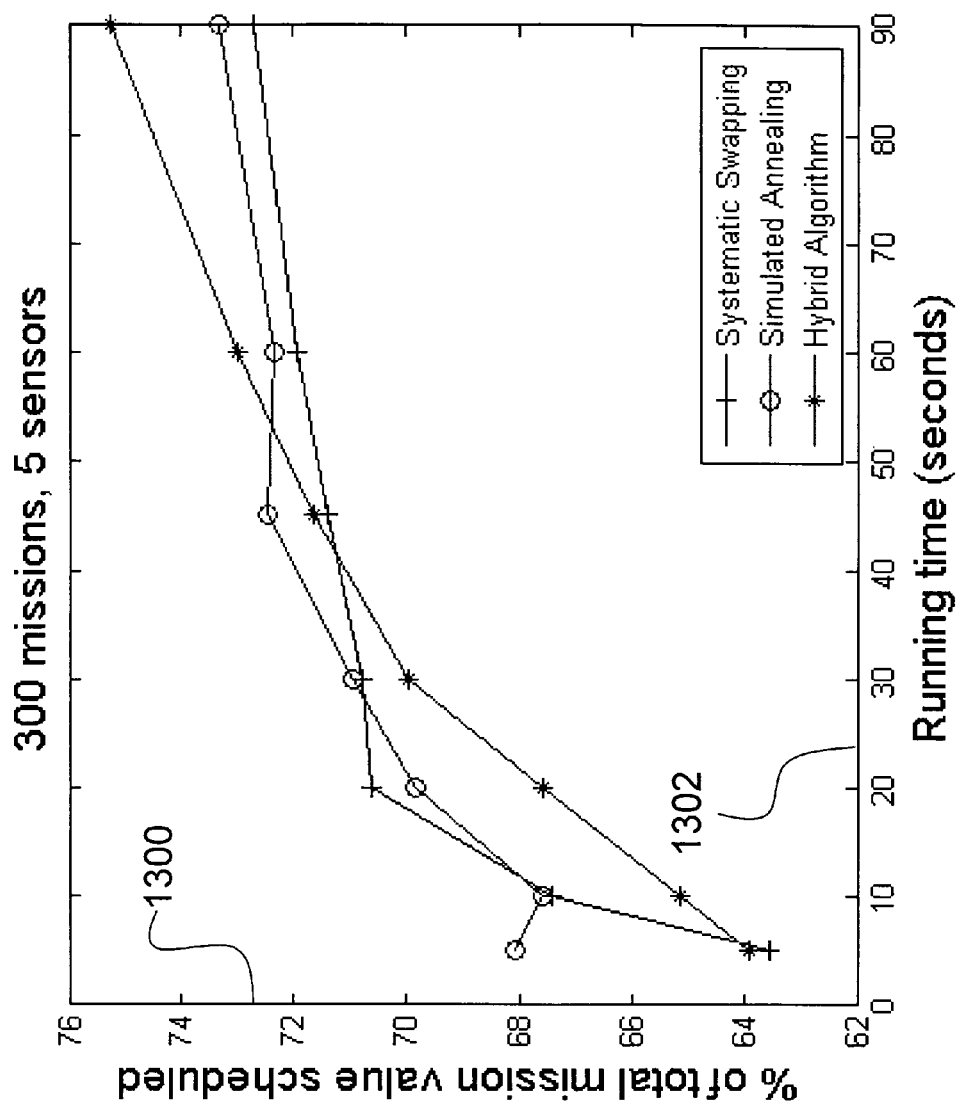
FIG. 13D is a graph illustrating exemplary comparisons in scheduling quality versus running time in 300 missions for the Systematic Swapping only algorithm, the Systematic Annealing algorithm, and the hybrid algorithm.

FIGS. 13A-13D show four plots demonstrating the effectiveness of the multi-algorithm method, showing the percentage of total mission value scheduled 1300 versus each algorithm's running time 1302. FIG. 13A illustrates the Systematic Swapping, Simulated Annealing, and hybrid algorithms run over fifty missions using two sensors. FIG. 13B illustrates' the results of the three algorithms run over 100 missions using two sensors. FIG. 13C illustrates the results of the three algorithms run over 200 missions using five sensors. Finally, FIG. 13D illustrates the results of the three algorithms run over 300 missions using five sensors. The plots display the mean performances of each of the algorithms, taken over fifty to 300 Monte Carlo runs. For each run, a scenario with the specified parameters is randomly generated and each algorithm is run on it. Each of the plots shows the multi-algorithm "hybrid" method to be superior to either of the singular methods as the contract time (i.e., running time 1302) increases. However, the results seem less certain when the running time 1302 is shorter. The intuitive explanation for this is that when the running time 1302 is shorter, each algorithm must spend a larger portion of the available time on the easily schedulable tasks. As the running time 1302 increases, the algorithms have more time to employ their specialized techniques for scheduling the less obvious tasks. This is where the hybrid algorithm dominates the other two. By combining the two different methods of improving the schedule, the multi-algorithm hybrid method consistently produces superior schedules.

What is claimed is:

1. A computer implemented method for multi-mission scheduling, the method comprising an act of:

causing a computer with a processor and a memory to execute instructions encoded on the memory to cause the processor to perform operations of:

compiling a list of a plurality of missions, each of which includes at least one task, and where each mission has a mission value associated with it such that the mission value reflects an ordering priority of the mission;

compiling a list of available resources, the available resources being usable for completing tasks;

specifying a global time-budget for allocating available resources to complete missions to maximize a total mission value;

identifying the mission with the largest mission value;

identifying whether the mission includes a task that needs additional resources in order to complete the task;

when the mission includes a task that needs additional resources, identifying and scheduling the available resources that can complete the task, then identifying the mission with the next largest mission value and repeating the above procedure beginning with identifying if the mission includes any tasks that need additional resources;

when the resources that can complete the task are unavailable, then specifying a task-specific time-budget for a first task, wherein the task-specific time-budget is based on the amount of time remaining in the global time-budget and a value of the mission the first task belongs to; and re-allocating resources among the tasks until can either schedule the task or the task-specific time-budget is exhausted, and if the task-specific time budget is exhausted, then the task is a failed task;

identifying whether there are any failed tasks;

when there is at least one failed task, then identifying and scheduling the available resources that can complete the task;

when the resources that can complete the task are unavailable, then add the task to a list of unscheduled tasks and perform the following acts:

identifying a perturbed list, the perturbed list comprising all tasks in the schedule that are currently allocated resources that are sufficient to complete a task in the list of unscheduled tasks;

generating a first value of the schedule choosing a task at random from a list selected from a group consisting of the perturbed list and the list of unscheduled tasks;

when the task chosen is from the perturbed list, then de-allocating its resources, and if possible, re-allocate other resources chosen at random to the task, and if not possible, remove the task from the perturbed list and put it in the unscheduled list because it no longer has resources allocated to it;

when the task chosen is from the list of unscheduled tasks, then allocating resources chosen at random to the task and move it from the unscheduled list to the perturbed list;

generating a second value of the schedule;

comparing the first value to the second value;

when the second value is greater than the first value, then keeping the schedule corresponding to the second value, then identifying the mission with the next largest mission value and repeating the above procedure beginning with identifying whether the mission includes a task that needs additional resources; and when the first value is greater than the second value, then reverting to the schedule that corresponds to the first value, then repeating the above procedure beginning with the act of identifying a perturbed list, such that the procedure is repeated until a predetermined probability threshold is reached, where the predetermined probability threshold is dependent upon the task-specific time-budget; and when all tasks in the mission have been allocated a sufficient amount of resources, then identifying the mission with the next largest mission value and repeating the above procedure beginning with identifying whether the mission includes a task that needs additional resources until all missions in the list of plurality of missions have been scheduled or processed through the above procedure.

2. A system for multi-mission scheduling, the system comprising:

a memory and a processor, the memory being encoded with instructions that, when executed, cause the processor to perform operations of:

compiling a list of a plurality of missions, each of which includes at least one task, and where each mission has a mission value associated with it such that the mission value reflects an ordering priority of the mission;

compiling a list of available resources, the available resources being usable for completing tasks;

specifying a global time-budget for allocating available resources to complete missions to maximize a total mission value;

identifying the mission with the largest mission value;

identifying whether the mission includes a task that needs additional resources in order to complete the task;

when the mission includes a task that needs additional resources, identifying and scheduling the available resources that can complete the task, then identifying the mission with the next largest mission value and repeating the above procedure beginning with identifying if the mission includes any tasks that need additional resources;

when the resources that can complete the task are unavailable, then specifying a task-specific time-budget for a first task, wherein the task-specific time-budget is based on the amount of time remaining in the global time-budget and a value of the mission the first task belongs to; and re-allocating resources among the tasks until can either schedule the task or the task-specific time-budget is exhausted, and if the task-specific time budget is exhausted, then the task is a failed task; and identifying whether there are any failed tasks;

when there is at least one failed task, then identifying and scheduling the available resources that can complete the task, when the resources that can complete the task are unavailable, then add the task to a list of unscheduled tasks and perform the following acts:

identifying a perturbed list, the perturbed list comprising all tasks in the schedule that are currently allocated resources that are sufficient to complete a task in the list of unscheduled tasks;

generating a first value of the schedule choosing a task at random from a list selected from a group consisting of the perturbed list and the list of unscheduled tasks;

when the task chosen is from the perturbed list, then de-allocating its resources, and if possible, re-allocate other resources chosen at random to the task, and if not possible, remove the task from the perturbed list and put it in the unscheduled list because it no longer has resources allocated to it;

when the task chosen is from the list of unscheduled tasks, then allocating resources chosen at random to the task and move it from the unscheduled list to the perturbed list, generating a second value of the schedule;

comparing the first value to the second value;

when the second value is greater than the first value, then keeping the schedule corresponding to the second value, then identifying the mission with the next largest mission value and repeating the above procedure beginning with identifying whether the mission includes a task that needs additional resources; and when the first value is greater than the second value, then reverting to the schedule that corresponds to the first value, then repeating the above procedure beginning with the act of identifying a perturbed list, such that the procedure is repeated until a predetermined probability threshold is reached, where the predetermined probability threshold is dependent upon the task-specific time-budget; and when all tasks in the mission have been allocated a sufficient amount of resources, then identifying the mission with the next largest mission value and repeating the above procedure beginning with identifying whether the mission includes a task that needs additional resources until all missions in the list of plurality of missions have been scheduled or processed through the above procedure.

3. A computer program product for multi-mission scheduling, the computer program product comprising computer-readable instruction means stored on a non-transitory computer-readable medium that are executable by a computer for causing the computer to perform operations of:

compiling a list of a plurality of missions, each of which includes at least one task, and where each mission has a mission value associated with it such that the mission value reflects an ordering priority of the mission;

compiling a list of available resources, the available resources being usable for completing tasks;

specifying a global time-budget for allocating available resources to complete missions to maximize a total mission value;

identifying the mission with the largest mission value;

identifying whether the mission includes a task that needs additional resources in order to complete the task;

when the mission includes a task that needs additional resources, identifying and scheduling the available resources that can complete the task, then identifying the mission with the next largest mission value and repeating the above procedure beginning with identifying if the mission includes any tasks that need additional resources;

when the resources that can complete the task are unavailable, then specifying a task-specific time-budget for a first task, wherein the task-specific time-budget is based on the amount of time remaining in the global time-budget and a value of the mission the first task belongs to; and re-allocating resources among the tasks until can either schedule the task or the task-specific time-budget is exhausted, and if the task-specific time budget is exhausted, then the task is a failed task; and identifying whether there are any failed tasks;

when there is at least one failed task, then identifying and scheduling the available resources that can complete the task;

when the resources that can complete the task are unavailable, then add the task to a list of unscheduled tasks and perform the following acts:

identifying a perturbed list, the perturbed list comprising all tasks in the schedule that are currently allocated resources that are sufficient to complete a task in the list of unscheduled tasks;

generating a first value of the schedule choosing a task at random from a list selected from a group consisting of the perturbed list and the list of unscheduled tasks;

when the task chosen is from the perturbed list, then de-allocating its resources, and if possible, re-allocate other resources chosen at random to the task, and if not possible, remove the task from the perturbed list and put it in the unscheduled list because it no longer has resources allocated to it;

when the task chosen is from the list of unscheduled tasks, then allocating resources chosen at random to the task and move it from the unscheduled list to the perturbed list;

generating a second value of the schedule;

comparing the first value to the second value;

when the second value is greater than the first value, then keeping the schedule corresponding to the second value, then identifying the mission with the next largest mission value and repeating the above procedure beginning with identifying whether the mission includes a task that needs additional resources; and when the first value is greater than the second value, then reverting to the schedule that corresponds to the first value, then repeating the above procedure beginning with the act of identifying a perturbed list, such that the procedure is repeated until a predetermined probability threshold is reached, where the predetermined probability threshold is dependent upon the task-specific time-budget; and when all tasks in the mission have been allocated a sufficient amount of resources, then identifying the mission with the next largest mission value and repeating the above procedure beginning with identifying whether the mission includes a task that needs additional resources until all missions in the list of plurality of missions have been scheduled or processed through the above procedure.

* * * * *